United States Patent
Miklós et al.

(10) Patent No.: US 9,722,929 B2
(45) Date of Patent: Aug. 1, 2017

(54) CONGESTION AWARE THROUGHPUT TARGETS

(71) Applicant: Telefonaktiebolaget L M Ericsson (publ), Stockholm (SE)

(72) Inventors: György Miklós, Pilisborosjenő (HU); Aldo Bolle, Västra Frölunda (SE); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/782,973

(22) PCT Filed: Apr. 8, 2014

(86) PCT No.: PCT/EP2014/056961
§ 371 (c)(1),
(2) Date: Oct. 7, 2015

(87) PCT Pub. No.: WO2014/166884
PCT Pub. Date: Oct. 16, 2014

(65) Prior Publication Data
US 2016/0359750 A1    Dec. 8, 2016

Related U.S. Application Data

(60) Provisional application No. 61/809,637, filed on Apr. 8, 2013.

(30) Foreign Application Priority Data

Jun. 20, 2013  (WO) ................ PCT/EP2013/060090

(51) Int. Cl.
*H04W 24/00*    (2009.01)
*H04W 80/04*    (2009.01)
(Continued)

(52) U.S. Cl.
CPC .............. *H04L 47/24* (2013.01); *H04L 5/006* (2013.01); *H04L 43/16* (2013.01)

(58) Field of Classification Search
CPC ....... H04L 47/10; H04L 47/12; H04L 47/125; H04L 47/20; H04W 28/0252; H04W 28/0284; H04W 28/0289
See application file for complete search history.

(56) References Cited

U.S. PATENT DOCUMENTS

2004/0170127 A1 *   9/2004   Tanaka .................... H04L 47/10
                                                       370/235
2005/0174965 A1     8/2005   Sarkkinen et al.
(Continued)

FOREIGN PATENT DOCUMENTS

WO    2009/008817 A1    1/2009

OTHER PUBLICATIONS

International Search Report and Written Opinion issued by the International Searching Authority in corresponding International Application No. PCT/EP2014/056961 dated May 30, 2014, 6 pages.

*Primary Examiner* — Andrew Lee
(74) *Attorney, Agent, or Firm* — Rothwell, Figg, Ernst & Manbeck, P.C.

(57) ABSTRACT

Described herein is a Core Network (CN) node 200 and a Radio Access Network (RAN) node 100 and methods therein for handling quality of service, QoS, targets for traffic flows between the RAN, node and a radio terminal 300 served by the RAN node, disclosing an obtaining a number of traffic classes into which the traffic flows can be classified, and QoS targets are defined for each obtained traffic class for at least two congestion levels, and wherein the traffic classes with the associated QoS targets and congestion levels are provided to the RAN node so as to
(Continued)

provide congestion level dependent QoS targets for the traffic classes to the RAN node.

26 Claims, 7 Drawing Sheets

(51) Int. Cl.
  *H04L 12/851* (2013.01)
  *H04L 5/00* (2006.01)
  *H04L 12/26* (2006.01)

(56) References Cited

U.S. PATENT DOCUMENTS

| | | |
|---|---|---|
| 2006/0039313 A1 | 2/2006 | Chou et al. |
| 2009/0268684 A1* | 10/2009 | Lott .................... H04W 72/087 370/329 |
| 2011/0170414 A1* | 7/2011 | Lee .................... H04L 41/5022 370/236 |
| 2012/0039175 A1* | 2/2012 | Sridhar ................. H04L 47/125 370/236 |
| 2013/0329559 A1* | 12/2013 | Cabrera ............ H04W 28/0289 370/235 |
| 2014/0213310 A1* | 7/2014 | Yeh ....................... H04W 72/08 455/501 |
| 2014/0254356 A1* | 9/2014 | Jeong ..................... H04L 47/20 370/229 |
| 2014/0328183 A1* | 11/2014 | Au .................... H04W 28/0284 370/237 |
| 2014/0355463 A1* | 12/2014 | Smith ................... H04M 15/60 370/252 |
| 2015/0043346 A1* | 2/2015 | Miller ................... H04L 47/122 370/234 |
| 2015/0172954 A1* | 6/2015 | Zhang .................... H04L 47/12 370/230 |
| 2015/0373077 A1* | 12/2015 | Ramamurthi ......... H04W 36/14 709/219 |
| 2016/0112896 A1* | 4/2016 | Karampatsis ..... H04W 28/0252 370/230.1 |

\* cited by examiner

CONGESTION AWARE THROUGHPUT TARGETS

CROSS REFERENCE TO RELATED APPLICATION(S)

This application is a 35 U.S.C. §371 National Phase Entry Application from PCT/EP2014/056961, filed Apr. 8, 2014, which claims priority to U.S. Application No. 61/809,637 filed Apr. 8, 2013 and International Application No. PCT/EP2013/060090 filed Jun. 20, 2013. The above identified applications are incorporated by reference.

TECHNICAL FIELD

Exemplifying embodiments presented herein are directed towards a Radio Access Node (RAN) and/or a Core Network (CN) node and a corresponding method in the RAN and/or CN node, which RAN and/or CN node is configured to operatively handle at least one of Congestion, User Plane Congestion Control (UPCON), throughput targets, Quality of Service (QoS), quality of experience (QoE) for a user of a radio terminal at congestion situations.

BACKGROUND

Packet data traffic is growing very quickly in mobile operator networks, in many cases it grows much more quickly than the rate at which the operator can expand its network capacity. This leads to more frequent occurrences of network congestion when the offered traffic is higher than what the RAN (radio access network) is able to fulfill. Also, new services appear often, which may lead to a situation when a new QoE requirement has to be introduced into the network quickly. In this situation, operators need efficient and flexible tools by which they can control how the bottleneck RAN capacity can be best shared so that they can maximize the Quality of Experience of their users.

The current 3GPP QoS is based on the bearer mechanism, e.g. as described in 3GPP TS 23.401 section 4.7.2. Traffic that requires differentiated QoS treatment is classified into bearers. For each bearer, the QoS Class Identifier (QCI) parameter determines the basic QoS treatment. A few other parameters, such as the Maximum Bitrate (MBR), Guaranteed Bitrate (GBR), UE or Access Point Name (APN) specific Aggregate Maximum Bitrate (AMBR) and Allocation and Retention Priority (ARP) parameters can further influence the quality of service applied to the bearer traffic.

The bearer based QoS has some limitations which has so far prevented its wide adoption. One limitation is that for 3G, the network based QoS mechanism requires the release-7 Network Initiated Dedicated Bearer (NIDB) support, which has so far not yet materialized in terminal equipment. Even though new NIDB enable terminals may come out, it may take a few years before they reach a sufficiently high penetration for operators to make efficient use of the feature.

As another limitation, the currently defined QoS parameters do not provide a predictable QoE in congestion situations. The GBR and MBR parameters only apply to GBR bearers while most of the traffic currently goes over non-GBR bearers. The AMBR parameter only allows enforcement of a maximum over several bearers which is not flexible enough to specify congestion behavior.

Moreover, in the context of the 3GPP UPCON (User plane congestion management) work item, a new type of solution has recently been put forward which utilizes congestion feedback from the CN to the RAN. This has e.g. been documented in 3GPP TR 23.705 version 0.3 section 6.1. When RAN indicates congestion to the CN, the CN can take actions to mitigate the congestion, e.g. such as limiting some classes of traffic. Congestion feedback as proposed so far is based on the measurement of the RAN load, i.e., resource utilization, and providing congestion feedback when the average load over a period of time exceeds a pre-defined threshold level. A main characteristic of such load-based congestion feedbacks is that it cannot differentiate in the congestion status once RAN is fully loaded. Load-based congestion feedback is illustrated in FIG. 10. Load-based congestion feedback considers all packets to be equal Possible examples for load-based congestion feedback can be:
whether the radio resource utilization in the air interface exceeds 90% over a 10 sec averaging period;
whether the total sum of buffer lengths for all users averaged over 10 sec exceeds a pre-defined threshold.

FIG. 11 is a schematic illustration of a functional split between RAN and CN with load-based congestion feedback. Functional steps such as "Load measurement" and "RAN QoS re-modeling" etc are indicated without considering which logical node these entities map to. In the CN, the load information is not directly useable to base CN action on, because very different QoS levels can all lead to similar load levels. Hence the CN re-models the RAN QoS based on the load-based congestion feedback and other information available on the CN about the actual QoS status in the RAN. The CN re-modeling tries to approximate the RAN congestion status, but it can never be fully accurate as the RAN fluctuations are very quick and unpredictable, e.g. due to changes in the radio channel quality and varying traffic mix. Thus, there is no direct relationship in the RAN between the realized RAN QoS and the congestion feedback based on load measurements. The result of the RAN QoS re-modeling is a measure of the QoS aware congestion level, or QoS level in short, which can then form a basis for potential CN action in accordance with operator QoS policy.

As already mentioned in the "Background" section, the bearer based QoS has some limitations, which has so far prevented its wide adoption, e.g. network based QoS mechanism requires the release-7 Network Initiated Dedicated Bearer (NIDB) support, which has so far not yet materialized in terminal equipment. Another limitation is that the currently defined QoS parameters do not provide a predictable QoE in congestion situations. The GBR and MBR parameters only apply to GBR bearers, while most of the traffic currently goes over non-GBR bearers. The Aggregate Maximum Bitrate (AMBR) parameter only allows enforcement of a maximum over several bearers, which is not flexible enough to specify congestion behavior.

Moreover, using a load-based congestion feedback from the RAN to the CN causes a number of disadvantages. Load-based congestion feedback considers all packets to be equal when it comes to congestion reporting. Even though two different packets may be part of traffic flows that represent highly different values to the user and the operator, they have equal role when it comes to load-based congestion feedback reporting. Load-based congestion feedback ignores the quality of experience observed by the user for a given traffic flow, and ignores the quality of service requirements that the operator sets.

There are a number of consequences of this simplistic congestion feedback reporting, of which some are summarized in the bullets below.

Unclear interpretation. The same congestion feedback is reported no matter whether the high load comes from a few happy file sharing users only, or from many unhappy premium users.

Complex processing in the CN. As a result of the unclear interpretation, the core network has to perform significant processing functions to arrive at possible actions that may be meaningful to the users and the operator. The CN has to re-model the congestion level experienced in the RAN to determine the QoS aware congestion level before it can determine whether any meaningful action could be taken.

Inaccurate QoS level. A CN based approximation of the RAN congestion status and consequent QoS aware congestion level estimation can never be fully accurate, as the load-based congestion feedback carries delayed and filtered information, and the changes in the radio channel and traffic mix can only be followed with a limited precision in the CN.

Heavy signalling. The load status in the RAN can change very frequently: even a small number of users can frequently cause high load due to traffic intensive applications (such as video on larger screens or big downloads) that can cause the RAN to be fully utilized for a period of time, after which the load can again drop. The load-based congestion feedback is therefore expected to result in a very high congestion feedback signalling load due to the frequent changes in load status. One way to decrease that signalling would be to use longer averaging periods, but that makes the solution inefficient, since the congestion feedback would be delayed and filtered to only very long congestion events. Also, oscillation problems are intensified with more delay in the feedback.

RAN under-utilization. A system which acts on a load based indication to mitigate the load is likely to oscillate around the threshold where RAN reports congestion. Upon a congestion indication from the RAN, the CN takes action to reduce the traffic, leading to lowered RAN load, eventually leading to a status change and congestion feedback from the RAN ends. That triggers the CN to stop or lessen the traffic reduction, which goes on until RAN eventually reports congestion once again and the process starts all over. The congestion reporting load threshold cannot be at 100% utilization, because an averaged load value would in most cases not reach 100%. But if the threshold is somewhere lower (e.g. at 90%) and the system targets that threshold, it leads to a (e.g. 10%) loss or capacity due to underutilization. Even if the threshold is higher, the oscillations due to CN mitigation actions that lead to the eventual avoidance of the congestion feedback would cause RAN resource under-utilization.

SUMMARY

Some aspects of the present solution suggest the following concept:

Traffic flows within a bearer is classified into Traffic Classes (TCs); traffic classification may e.g. be performed based on at least one of user subscription and/or service category. The Traffic Class (TCs) for a traffic flow may be indicated based on bearer association for the traffic flow, e.g. identified by the bearer QoS Class Identifier (QCI) of the particular bearer comprising the traffic flow. Alternatively, the Traffic Class (TCs) for a traffic flow may be indicate based on packet marking of the packets in the traffic flow. It is preferred that packets of a traffic flow belonging to a particular Traffic Class (TC) are marked in a similar manner. Alternatively, the Traffic Class (TC) for a traffic flow may be indicated based on a combination of bearer association for the traffic flow and packet marking.

Each traffic class is associated with QoS targets, e.g. target throughputs (e.g. such as target bitrates or similar) at pre-defined congestion levels. For example, if three levels of congestion are defined (High, Medium and Low congestion) then three target throughput levels can be associated with those congestion levels for each traffic class so as to form three congestion level dependent throughput targets for each traffic class. However, note that one or more traffic class may then have fewer throughput targets than three, e.g. one or more traffic class may have zero (0) throughput as one and the same throughput target for several congestion levels (see e.g. FIG. 9 wherein traffic class Background has zero (0) throughput as target for both medium and high congestion level).

The RAN resource allocation is such that it tries to satisfy the QoS targets, e.g. throughput targets at the lowest congestion level that is feasible. In other words, if the throughput targets for the Low congestion level are possible to satisfy for all traffic classes, resource allocation is done accordingly. If the throughput targets for the Low congestion level are not feasible for all traffic classes, then the throughput targets for a Medium congestion level may be satisfied if that is feasible. If the throughput targets for the Medium congestion level are not feasible for all traffic classes, then the throughput targets for a High congestion level may be satisfied if that is feasible. Excess resources that remain over the target throughput levels are distributed in an unspecified way (e.g., in proportion to the throughput targets, or evenly, or in another way.)

In the CN (Determining traffic classes and QoS targets—e.g. congestion level dependent QoS targets—and communicating such classes and targets to the RAN)

Some embodiments of the present solution are directed to a method in a CN node for handling QoS targets for traffic flows between the CN node and a RAN node and/or traffic flows between the RAN node and a radio terminal served by the RAN node, wherein the method comprises:

determining and/or obtaining a number of traffic classes into which the traffic flows can be classified, determining and/or obtaining QoS targets for each traffic class, preferably also providing the traffic classes and the QoS targets to the RAN node.

Some other embodiments of the present solution are directed to a CN node for handling QoS targets for traffic flows between the CN node and a RAN node and/or traffic flows between the RAN node and a radio terminal served by the RAN node, wherein a processing circuitry 210 is configured to operatively:

determine and/or obtain a number of traffic classes into which the traffic flows can be classified, determine and/or obtain QoS targets for each traffic class, and preferably also provide the traffic classes and the QoS targets to the RAN node.

A traffic flow may e.g. be comprised by a bearer established between the CN node and a RAN node and/or a bearer (e.g. a radio bearer, e.g. such as a Radio Access Bearer (RAB) or similar) established between the RAN node and a radio terminal, e.g. such as a UE or similar.

A radio terminal may e.g. be a mobile station (MS) or a user equipment unit (UE) or similar, e.g. such as mobile telephones also known as "cellular" telephones, and laptops with wireless capability, and thus can be, for example, portable, pocket, hand-held, computer-comprised, or car-mounted mobile devices which communicate voice and/or data with radio access network.

A QoS target may be one or more simple QoS targets, e.g. any information indicating one ore more of;
a bandwidth target,
a throughput target (e.g. bit rate or similar),
a Bit Error Rate (BER) or a Block Error Rate (BLER) target,
a loss of data target (e.g. the percentage of lost data),
a delay or a latency or jitter (variation in latency) target,
a retransmission (e.g. number of retransmissions) or a retransmission frequency target, Embodiments of the present solution may use QoS targets in the form of congestion level dependent QoS targets, as will be described in more detail below. A congestion level dependent QoS target may e.g. be based on one or more of the more simpler QoS targets mentioned above.

In the CN (Continued)
(Receiving information indicating a QoS based congestion from a RAN node in a CN node)

Some embodiments of the present solution are directed to a method in a CN node for handling QoS targets for traffic flows between the RAN node and a CN node and/or traffic flows between the RAN node and a radio terminal served by the RAN node, wherein the method comprises:
receiving congestion information from the RAN node indicating a QoS based congestion in the RAN node, i.e. a congestion based on the failure of satisfying a QoS target at a congestion in the RAN node,
determining load instructions to be used by the RAN node for reducing or adapting the QoS based congestion in the RAN node.

It is preferred that the method also comprises sending the load instructions to the RAN node, so as to enable the RAN node to reduce or adapt the QoS based congestion in the RAN node.

Some other embodiments of the present solution are directed to a CN node for handling QoS targets for traffic flows between the CN node and a RAN node and/or traffic flows between the RAN node and a radio terminal served by the RAN node, wherein a processing circuitry 210 is configured to operatively:
receive congestion information from the RAN node indicating a QoS based congestion in the RAN node, i.e. a congestion based on the failure of satisfying a QoS target at a congestion in the RAN node,
determine load instructions to be used by the RAN node for reducing or adapting the QoS based congestion in the RAN node.

It is preferred that the processing circuitry 210 is also configured to operatively send the load instructions to the RAN node, so as to enable the RAN node to reduce or adapt the QoS based congestion in the RAN node.

In the RAN
(Receiving or pre-configure traffic classes and QoS targets— e.g. congestion level dependent QoS targets—and using the traffic classes and QoS targets)

Some other embodiments of the present solution are directed to a method in a RAN node for handling QoS targets for traffic flows between the RAN node and a CN node and/or traffic flows between the RAN node and a radio terminal served by the RAN node, wherein the method comprises:
receiving from the CN node at least one of; traffic classes into which the traffic flows can be classified and QoS targets for each traffic class, or pre-configuring in the RAN node at least one of; traffic classes into which the traffic flows can be classified and QoS targets for each traffic class,
classifying each traffic flow into a traffic class, and
obtaining congestion information indicating a congestion level in the RAN node (e.g. a current congestion level) and determining a QoS target for each traffic class based on the obtained congestion information.

It is preferred that the method also comprises detecting that at least one determined QoS target can not be satisfied at the obtained congestion level, and sending congestion information to the CN node indicating a QoS based congestion in the RAN node, i.e. a congestion based on the failure of satisfying a QoS target at a congestion in the RAN node.

Some other embodiments of the present solution are directed to a RAN node for handling QoS targets for traffic flows between the RAN node and a CN node, and/or traffic flows between the RAN node and a radio terminal served by the RAN node, wherein a processing circuitry 110 is configured to operatively:
receive from the CN node at least one of; traffic classes into which the traffic flows can be classified and QoS targets for each traffic class, or being pre-configured with at least one of; traffic classes into which the traffic flows can be classified and QoS targets for each traffic class,
classify each traffic flow into a traffic class, and
obtain congestion information indicating a congestion level in the RAN node (e.g. a current congestion level) and determining a QoS target for each traffic class based on the obtained congestion information.

It is preferred that the processing circuitry 110 is also configured to operatively detect that at least one determined QoS target can not be satisfied at the obtained congestion level, and to send congestion information to the CN node indicating a QoS based congestion in the RAN node, i.e. a congestion based on the failure of satisfying a QoS target at a congestion in the RAN node.

Traffic classes and QoS targets may both be received by the RAN node; or traffic classes may be pre-configured in the RAN node while QoS targets are received; or traffic classes may be received by the RAN node while QoS targets are pre-configured in the RAN node.

The congestion information may e.g. indicate a congestion level in the form of exhaustion of available bandwidth or similar provided by the RAN node, or exhaustion of the available throughput or similar provided by the RAN node.

The traffic class for a traffic flow may be determined and/or obtained based on e.g. bearer association for the traffic flow (e.g. using QCI) and/or packet marking of the packets in the traffic flow (e.g. made by a CN node) as will be described in more detail below.

Some embodiments described herein may be summarised more explicitly in the following manner:

One embodiment is directed to a method in a core network, CN, node for handling quality of service, QoS, targets for traffic flows between a radio access network, RAN, node and a radio terminal served by the RAN node, wherein the method comprises: obtaining a number of traffic classes into which the traffic flows can be classified, and defining QoS targets for each obtained traffic class for at least two congestion levels, and providing the traffic classes with the associated QoS targets and congestion levels to the RAN node so as to provide congestion level dependent QoS targets for the traffic classes to the RAN node.

Another embodiment is directed to a core network, CN, node for handling quality of service, QoS, targets for traffic flows between a radio access network, RAN, node and a radio terminal served by the RAN node, wherein a processing circuitry is configured to operatively: obtain a number of traffic classes into which the traffic flows can be classified, and define QoS targets for each obtained traffic class for at least two congestion levels, and provide the traffic classes with the associated QoS targets and congestion levels to the RAN node so as to provide congestion level dependent QoS targets for the traffic classes to the RAN node.

Another embodiment is directed to a method in a radio access network, RAN, node for handling quality of service, QoS, targets for traffic flows between the RAN, node and a wireless terminal (300) served by the RAN node, wherein the method comprises: defining traffic classes into which the traffic flows can be classified and QoS targets for at least two congestion levels for each traffic class so as to provide congestion level dependent QoS targets for the traffic classes in the RAN node, and classifying each traffic flow received by the RAN node into a traffic class, and obtaining congestion information indicating a congestion level in the RAN node and determining a QoS target for each traffic class based on the obtained congestion level and the congestion level dependent QoS targets.

Another embodiment is directed to a radio access network, RAN, node for handling quality of service, QoS, targets for traffic flows between the RAN, node and a wireless terminal served by the RAN node, wherein a processing circuitry is configured to operatively: define traffic classes into which the traffic flows can be classified and QoS targets for at least two congestion levels for each traffic class so as to provide congestion level dependent QoS targets for the traffic classes in the RAN node, and classify each traffic flow received by the RAN node into a traffic class, and obtain congestion information indicating a congestion level in the RAN node and determining a QoS target for each traffic class based on the obtained congestion level and the congestion level dependent QoS targets

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
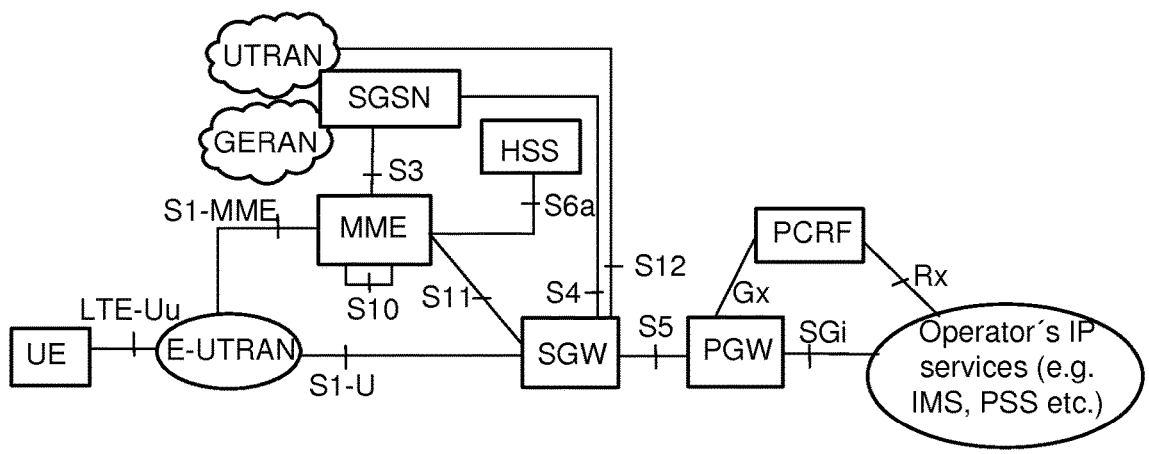
FIG. 1 is a schematic illustration of a well known exemplifying LTE architecture for 3GPP accesses within an Evolved Packet System (EPS)

FIG. 1 shows a schematic overview of a well known exemplifying wireless communication system. The system is a so called LTE based system. It should be emphasised that the terms "LTE" and "LTE based" system is here used to comprise both present and future LTE based systems, such as, for example, advanced LTE systems.

It should be appreciated that although FIG. 1 shows a wireless communication system in the form of a LTE based system, the example embodiments herein may also be utilized in connection with other wireless communication systems comprising nodes and functions that correspond to the nodes and functions of the system in FIG. 1.

Figure 2:
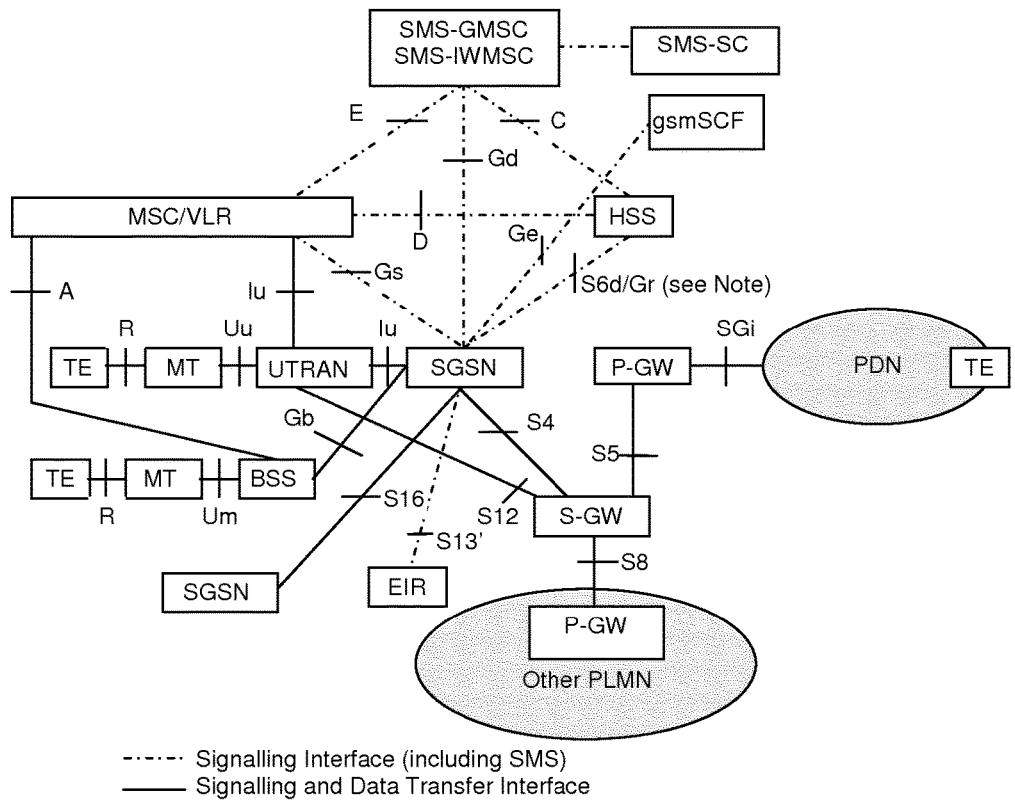
FIG. 2 is a schematic illustration of a well known exemplifying GPRS architecture based on S4 interface.

Thus, FIG. 2 shows a schematic overview of another exemplifying wireless communication system. The system is a well known exemplifying GPRS architecture.

Figure 3:
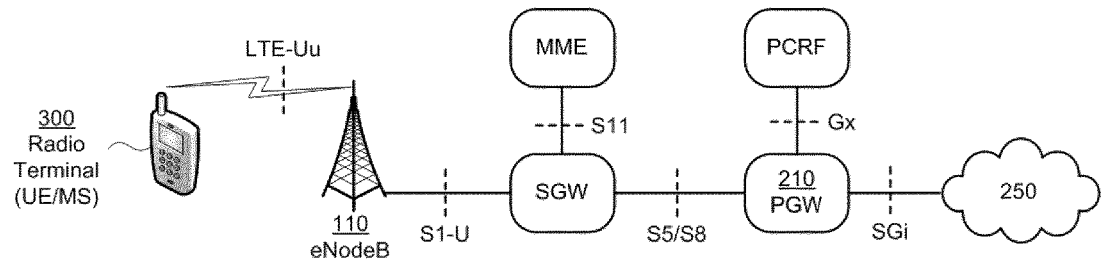
FIG. 3 is another schematic illustration of a well known exemplifying LTE architecture.

FIG. 3 shows another schematic illustration of a well known wireless communication system in the form of an exemplifying LTE architecture. As can be seen, the system comprises a base station in the form of an eNodeB, connected to a Serving Gateway (SGW), in turn connected to a Mobility Management Entity (MME) and a PDN Gateway (PGW), which in turn is connected to a Policy and Charging Rules Function (PCRF).

The eNodeB 110 is a radio access node that interfaces wirelessly with a radio terminal, which is denoted User Equipment (UE) in LTE. In fact, the eNodeBs of the system forms the radio access network E-UTRAN for LTE.

The SGW is a core network node that routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME is a core network node that is a key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs The PGW 210 is a core network node that provides connectivity to the UE to external packet data networks 250 by being the point of exit and entry of traffic for the UE. A UE may have simultaneous connectivity with more than one PGW for accessing multiple PDNs. Typically the PGW performs one ore more of; policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1× and EvDO).

The PCRF is a core network node that determines policy rules in real-time with respect to the radio terminals of the system. This may e.g. include aggregating information in real-time to and from the core network and operational support systems etc of the system so as to support the creation of rules and/or automatically making policy decisions for user radio terminals currently active in the system based on such rules or similar. The PCRF provides the PGW with such rules and/or policies or similar to be used by the acting as a Policy and Charging Enforcement Function (PCEF).

Figure 4:
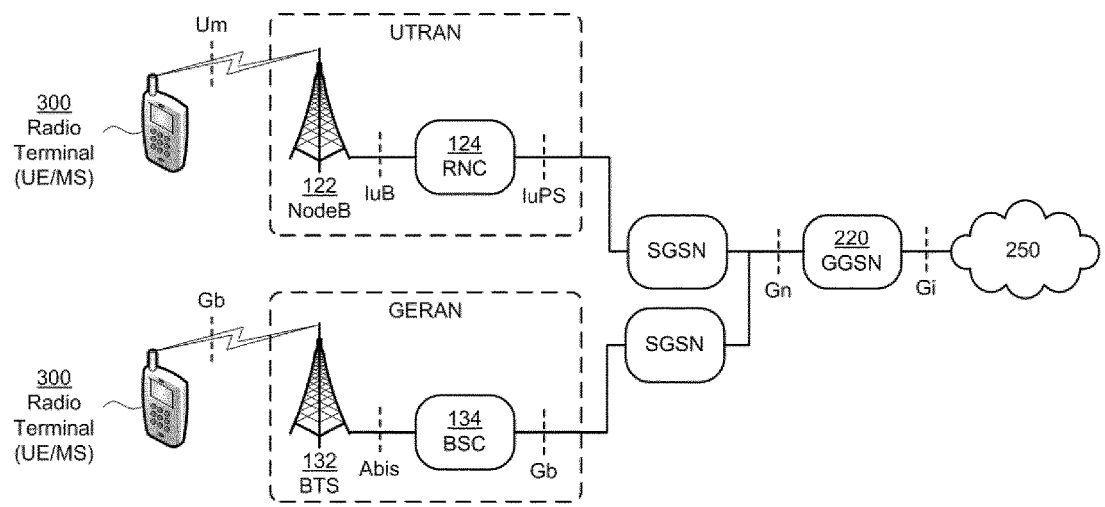
FIG. 4 is another schematic illustration of a well known exemplifying GPRS architecture.

FIG. 4 shows another schematic illustration of a well known wireless communication system in the form of an exemplifying GPRS architecture. As can be seen, the system comprises a Gateway GPRS Support Node (GGSN) connected to a first Serving GPRS Support Node (SGSN) and a second SGSN. In turn, the first SGSN is connected to a Radio Network Controller (RNC) that is connected to a base station in the form of a NodeB, whereas the second SGSN is connected to a Base Station Controller (BSC) that is connected to a base station in the form of a Base Transceiver Station (BTS).

The GGSN 220 is a core network node that is a main component of the GPRS network. The GGSN is responsible for the interworking between the GPRS network and external packet data networks 250, like the Internet and X.25 networks. The GGSN is the anchor point that enables the mobility of the user terminal in the GPRS/UMTS networks and it may be seen as the GPRS equivalent to the Home Agent in Mobile IP. It maintains routing necessary to tunnel the Protocol Data Units (PDUs) to the SGSN that services a particular Mobile Station (MS). The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. The GGSN is responsible for IP address assignment and is the default router for the connected user equipment (UE). The GGSN also performs authentication and charging functions. Other functions include subscriber screening, IP Pool management and address mapping, QoS and PDP context enforcement.

The SGSN is a core network node that is responsible for the delivery of data packets from and to the radio terminals such as mobile stations within its geographical service area. Its tasks include packet routing and transfer, mobility management (attach/detach and location management), logical link management, and authentication and charging functions. The location register of the SGSN stores location information (e.g., current cell, current Visitor Location Register (VLR)) and user profiles (e.g., International Mobile Station Identity (IMSI), address(es) used in the packet data network) of all GPRS users registered with this SGSN.

The RNC 124 is a radio access network node in the UMTS radio access network (UTRAN) and is responsible for controlling the NodeBs that are connected to it. The NodeB 122 is also a radio access node. The RNC carries out radio resource management, some of the mobility management functions and is the point where encryption is done before user data is sent to and from the mobile. The RNC connects to a Circuit Switched Core Network through Media Gateway (MGW) and to the SGSN in the Packet Switched Core Network.

The BSC 134 is a radio access network node in the GSM Radio Access Network (GERAN) and is responsible for controlling the BTSs that are connected to it. The BTS 132 is also a radio access network node. The BSC carries out radio resource management and some of the mobility management functions.

As can be seen in FIGS. 3 and 4, there are radio terminals such as UEs and/or MSs that communicate wirelessly with the eNodeB and/or the RNC via a NodeB and/or the BSC via a BTS using an air interface such as LTE-Uu, Um and Gb interface respectively. This makes it possible for the radio terminals to access resources provided by the core network of the systems respectively. A skilled person having the benefit of this disclosure realizes that vast number of well known radio terminals can be used in the various embodiments of the present solution. The radio terminal may e.g. be a cell phone device or similar, e.g. such as a Mobile Station (MS) or a User Equipment (UE) or similar, e.g. defined by the standards provided by the 3GPP. Thus, the radio terminal needs no detailed description as such. However, it should be emphasized that the mobile radio terminals may be embedded (e.g. as a card or a circuit arrangement or similar) in and/or attached to various other devices, e.g. such as various laptop computers or tablets or similar or other mobile consumer electronics or similar, or vehicles or boats or air planes or other movable devices, e.g. intended for transport purposes. Indeed, the radio terminal may even be embedded in and/or attached to various semi-stationary devices, e.g. domestic appliances or similar, or consumer electronics such as printers or similar having a semi-stationary mobility character.

Figure 5:
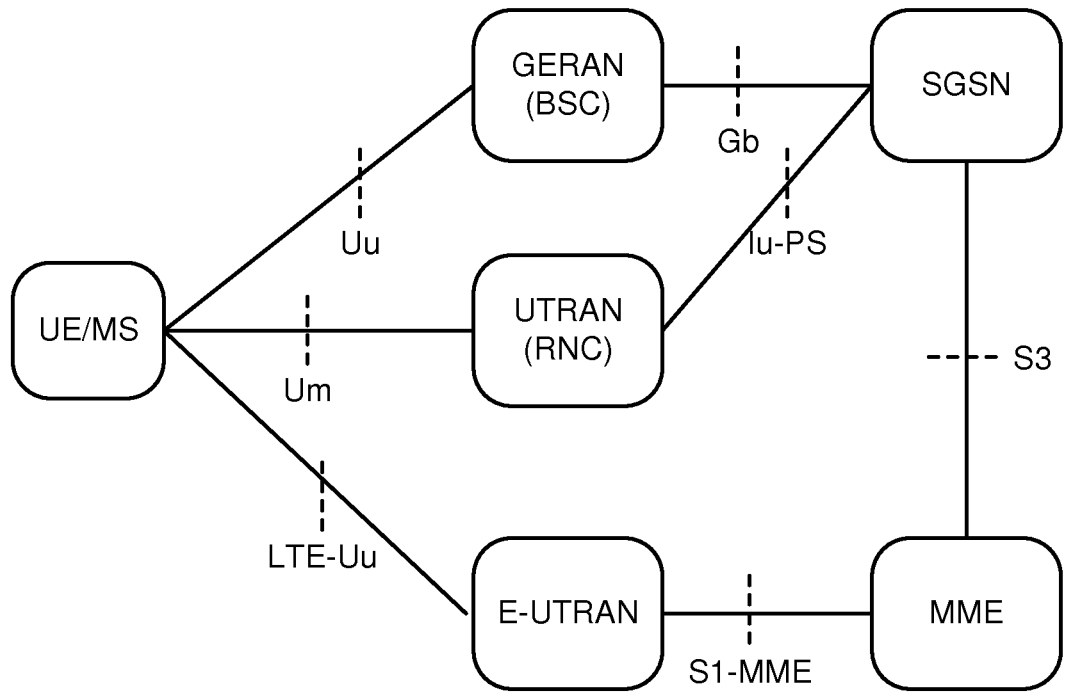
FIG. 5 is a schematic illustration of some well-known interconnections between a GERAN, a UTRAN, an E-UTRAN and a SGSN and a MME.
Figure 6:
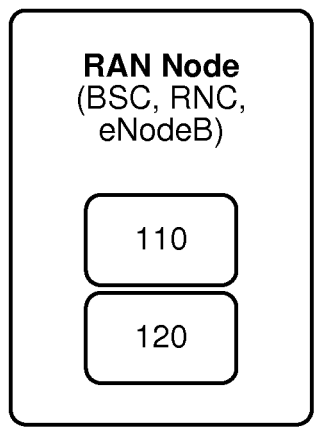
FIG. 6 is a schematic illustration of a RAN node according to some embodiments described herein.

FIG. 5 is a schematic illustration of some well known interconnections between a GERAN, a UTRAN and an E-UTRAN and the further well known interconnections between these RAN systems and a SGSN and a MME and the interconnection between the SGSN and the MME FIG. 6 illustrates an exemplifying RAN node 100 configured to operatively perform the operations of the exemplifying embodiments described herein. The RAN node may e.g. a BSC, a RNC, a NodeB, an eNodeB or a BTS. As shown in FIG. 6, the RAN node may comprise processing circuitry 110 and a memory 120. In particular embodiments, some or all of the functionality described herein may be provided by the processing circuitry 110 executing instructions stored on a computer-readable medium, e.g. such as the memory 120 shown in FIG. 6. Alternative embodiments of the RAN node may comprise additional components responsible for providing additional functionality, comprising any of the functionality identified herein and/or any functionality necessary to support the example embodiments described herein.

Figure 7:
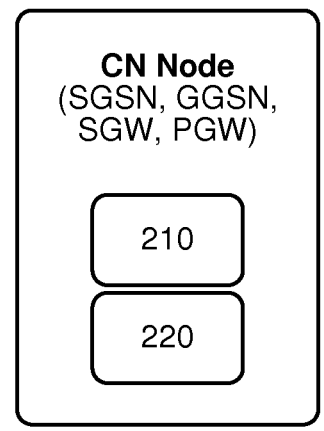
FIG. 7 is a schematic illustration of a Core Network node (CN node) node according to some embodiments described herein.

FIG. 7 illustrates an exemplifying Core Network node 200 (CN node) configured to operatively perform the operations of the exemplifying embodiments described herein. The CN node may e.g. a SGSN, a GGSN, a SGW or a PGW. As shown in FIG. 7, the CN node may comprise processing circuitry 210 and a memory 220. In particular embodiments, some or all of the functionality described herein may be provided by the processing circuitry 210 executing instructions stored on a computer-readable medium, e.g. such as the memory 220 shown in FIG. 7. Alternative embodiments of the CN node may comprise additional components responsible for providing additional functionality, comprising any of the functionality identified herein and/or any functionality necessary to support the example embodiments described herein.

To increase the level of operator control over the RAN congestion handling, it is proposed to define congestion level dependent QoS targets for a number of congestion levels. Note that the number of congestion levels can be arbitrarily increased for higher accuracy and control. The QoS targets apply to a traffic flow classified into a traffic class (TC), e.g. with a given combination of packet marking and bearer QCI as will be describe in more detail below. The traffic class determines the QoS treatment at each congestion level. The operator may e.g. use a O&M function of the network to configure the QoS parameters that determine the congestion level dependent QoS targets at different congestion levels for a given traffic class (TC).

It can be noted that embodiments of the present solution are typically described herein with reference to a Core Network (CN) node and a Radio Access Network (RAN) node. This should be understood such that any RAN node mentioned herein can be used in said embodiments together with any CN node mentioned herein, unless the context in which the nodes are mentioned clearly contradicts this.

Figure 8:
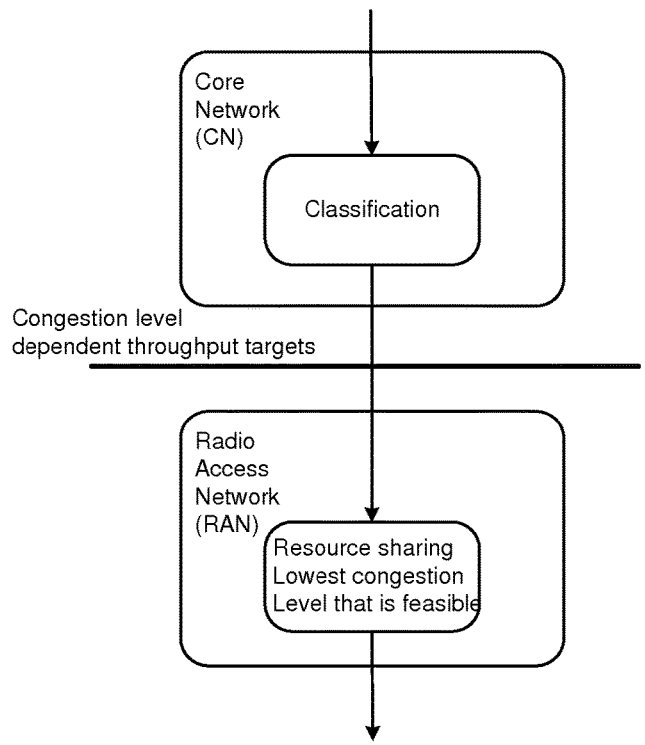
FIG. 8 shows representative components of some exemplifying embodiments of the present solution.

FIG. 8 shows representative components of some exemplifying embodiments of the present solution:
- a traffic classification function is typically performed in a Core Network (CN)—e.g. such as CN node 200;
- communication of the throughput targets for each traffic class to a RAN node—e.g. such as the RAN node 100—wherein the throughput targets are set for a pre-defined number of congestion levels;
- a RAN resource sharing control function which assigns the at least the target throughput for each traffic class, based on the throughput targets for the lowest congestion level that is feasible.

Figure 9:
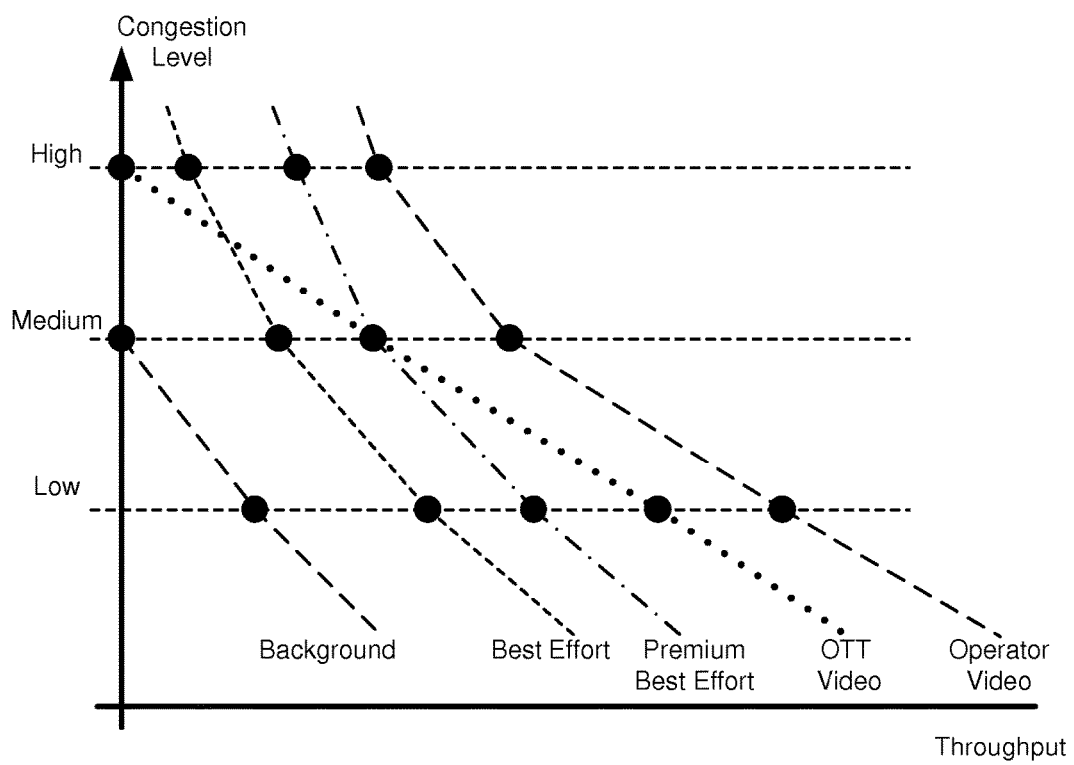
FIG. 9 shows a graphical representation of an example traffic classification and throughput setting.
Figure 10:
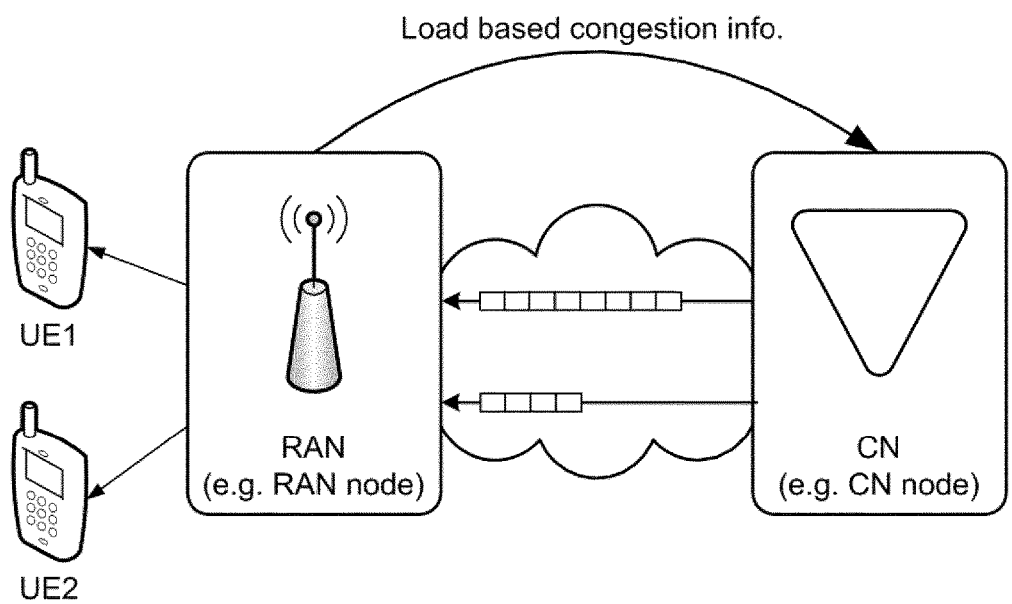
FIG. 10 shows a schematic illustration of a known exemplifying load-based congestion feedback.
Figure 11:
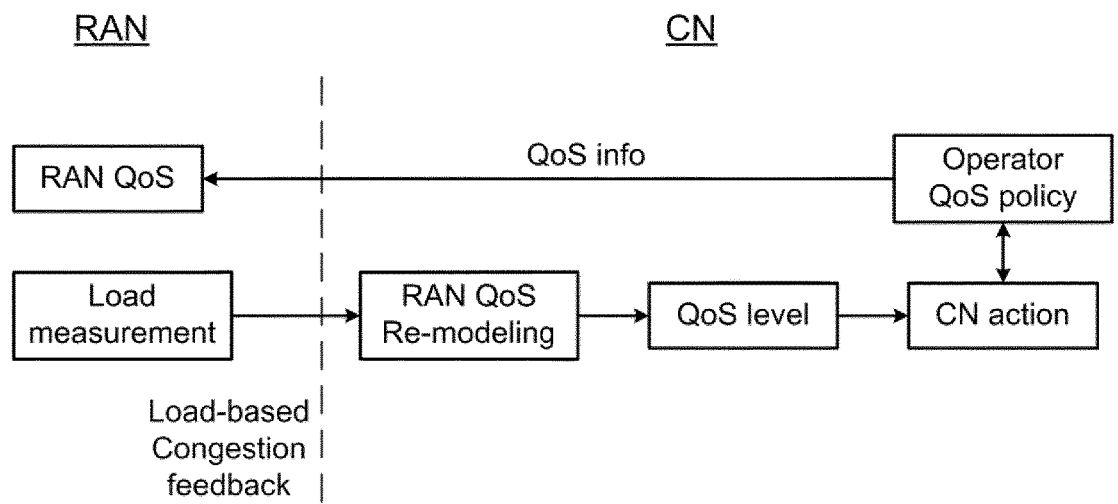
FIG. 11 show a schematic illustration of a known exemplifying RAN-CN functional split for load-based congestion feedback.

In FIG. 9 below, shows a graphical representation of an example traffic classification and congestion level dependent QoS targets in the form of exemplifying congestion level dependent throughput setting. The figure shows the congestion level dependent throughput settings for low, medium and high congestion levels (i.e., in this example three congestion levels are defined; this can of course be extended for other numbers of congestion levels).

For each user/radio terminal, the following traffic classes (TCs) are used:
- Background for e.g. large file downloads such as application, video, music background downloads;
- Two types of best effort TCs are used depending on the user's subscription: normal users get the regular "Best effort" TC, whereas for premium subscribers, the Premium Best Effort TC applies.
- Over The Top (OTT) video TC for third party video traffic.
- Operator video TC for operator provided video applications, and the rest of the traffic is considered best effort.

For easier representation, the big dots corresponding to the congestion level dependent throughput targets are connected by a line. However, it is the dots that represent the actual congestion level dependent throughput targets, which may be pre-defined in the RAN or communicated to the RAN and used in the resource sharing control.

Note that the throughput target for a lower congestion level of a given traffic class (TC) is normally higher than the throughput target for a higher congestion level, since we expect more throughput to be available with lower congestion.

This representation—as exemplified in FIG. 9—allows a very flexible operator setting for controlling how the resource sharing is performed under congestion. In the example shown in FIG. 9, the background traffic gets a lower share already at low congestion level, but it is completely stopped at medium congestion level to allow for more important traffic to pass through. OTT video is allowed a higher throughput at low and medium congestion levels, but at high congestion that is stopped in this example to allow more important traffic, such as the operator provided video application, to pass through. Premium subscribers get a higher throughput share in all congestion levels than normal subscribers.

The number of TCs with respect to the different applications/services and subscriptions can of course be increased to a higher granularity, depending on the operator's need for differentiation. The number and/or nature of the TCs may e.g. be determined by means of empirical investigations. In other occasions the number and character of the TCs may be the same as one of the sets of traffic classes determined in the 3GPP specifications.

Traffic Classification

Classifying a traffic flow into a suitable traffic class (TC) in a set of given traffic classes (TCs) may e.g. be done based on one of or a combination of SPI (shallow packet inspection) and DPI (deep packet inspection). SPI may e.g. involve checking the packet header fields, e.g. one or more of: IP source and/or destination addresses, TCP/UDP source and/or destination ports, protocol id field, IPsec fields, VPN tunneling fields, or additional header fields. DPI may e.g. involve checking the packet data contents, e.g. one ore more of: HTTP headers, packet lengths and timing characteristics, and so on. The SPI and DPI functions can be used to identify the application/service that the given packet falls into, and thus possibly also the traffic class to which the traffic flow comprising the packet should belong.

This may be combined with information about the user's subscription that may be available in the CN.

Traffic flows that have the same or similar characteristics may be associated with the same traffic class. For example, traffic flows with the same source address may in some occasions be associated with the same traffic class.

Classifying a traffic flow into a suitable traffic class (TC) may e.g. be performed at the GGSN or PGW nodes, or in a standalone node in the core network. It can be based on pre-configured rules, or using the PCC framework which is defined in 3GPP TS 23.203 and may be extended for this purpose.

As a result of the classification, the traffic flow is marked so as to indicate its association to a given traffic class (TC), which e.g. may represent a given combination of application/service and/or subscription. Typically, a traffic class is a subset of the traffic of a given user.

There are at least two tools available for the operator to identify traffic classes (TCs) in the RAN: today's well known bearer based traffic classes e.g. based on QCI or any other similar bearer based traffic classification, and packet marking based traffic classification.

Traffic classification based on QCI or similar may e.g. associate a traffic flow in a bearer or similar with a traffic class based on the QCI or similar allocated to the bearer or similar.

Traffic classification based on packet marking may e.g. use a header field of the packets in a traffic flow to associate the traffic flow with a traffic class, e.g. in downlink user plane packets, to differentiate certain sets of data packets from the point of view of QoS handling. Typically data packets belonging to a particular traffic flow are marked in a similar manner.

To mark the packets of a given traffic class, it is possible to use one or more of the methods below:

a) The Service Class Identifier (SCI) field describe in TS 23.060 section 5.3.5.3 for GERAN is one example of packet marking that can be extended to UTRAN and LTE as well. SCI uses a GTP-U header.
b) The Flow Priority Indicator (FPI) field described in TR 23.705 version 0.3 section 6.2 is another example of a packet marking. It is possible to utilize other forms of packet marking as well.
c) A separate Tunnel Endpoint ID (TEID) can be used for a given traffic class, e.g. used to classify different traffic flows into various traffic classes, e.g. such that traffic flows comprising TEIDs pointing at the same or similar source and/or destination or similar are associated with the same traffic class (see further realization below). TEIDs are currently used by the GTP protocol for separating traffic in different bearers. This can be extended such that not only the traffic in different bearers get a separate TEID, but also traffic in different traffic classes (TCs) in a single bearer.

To realize this, each time a RAN (e.g. such as RNC and/or eNB) node and the SGW/SGSN need to allocate a separate TEID for downlink traffic, it would allocate a number of TEIDs, one corresponding to each traffic class within the bearer. The number of TEIDs per bearer could be a configuration parameter. The TEIDs assigned for the TCs would be communicated using the same control messages as today. In this way, the GGSN/PGW node can become aware of the TEIDs used by the SGW or SGSN or RNC, and the SGW/SGSN node can also become aware of the TEIDs used by the RNC or eNB. To determine the number of TCs within the bearer, one of the following options may be used.

During the bearer setup control signaling, a new parameter ("number-of-TCs-per-bearer") can be used to set the number of traffic classes to be used within the bearer, which equals the number of TEIDs to be assigned. That parameter is included in the control message that establishes the bearer in the given node.

As another alternative, the number of TCs per bearer can also be pre-configured for a given QCI value, so that the QCI determines the number of TCs per bearer. In that case, the number of TCs for a given QCI can be pre-configured in the node, e.g. by O&M mechanisms.

As yet another alternative, a new flag may indicate in the bearer setup signaling whether or not multiple TCs per bearer are to be used, and a separate configuration then determines the actual number of TCs.

d) A new packet header field can be added which identifies the TC of the packet. The header field can e.g., be a new GTP-U header, or an IP option, or a GRE key. The new header may include an explicit identifier of the traffic class. Alternatively, the header may include more information (such as service and subscription information) from which the traffic class can be derived by a mapping function.

It is possible to apply only one of the two above indicated tools for indicating traffic classes (i.e. bearer based traffic classification e.g. based on QCI, or packet marking based traffic classification). Note that the packet marking based traffic classification can also be used in combination with the existing bearer based traffic classification using different QCIs. Note that bearer based differentiation can apply to both uplink and downlink traffic. As a special case, it is possible to use only the currently specified bearer based traffic classification without packet markings.

Figure 12:
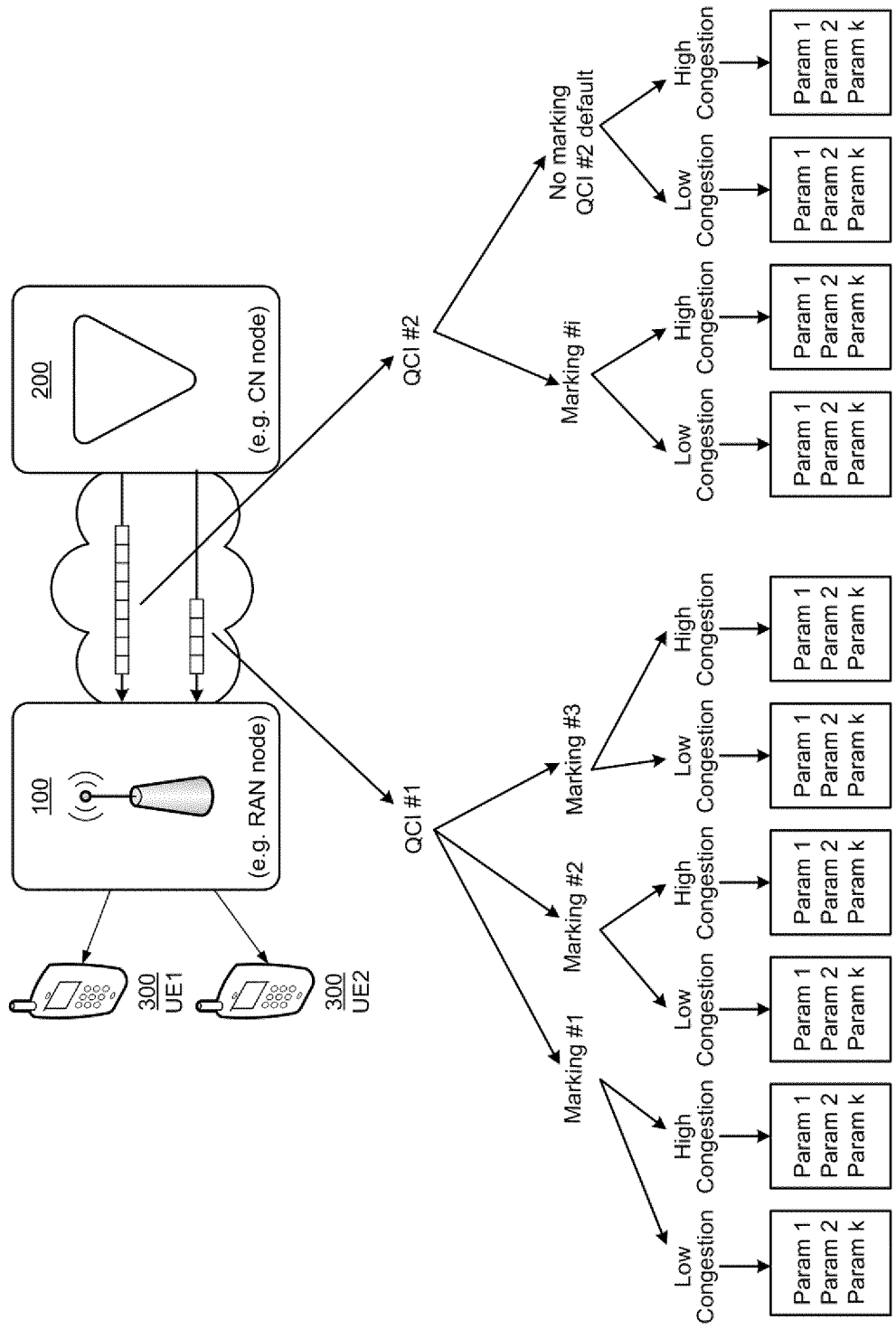
FIG. 12 shows a schematic illustration of a structure for congestion level dependent QoS targets using both bearer marking (e.g. QCI) and packet marking.

Below an exemplifying case is discussed with reference to FIG. 12, wherein the two tools (bearer based classification and packet marking based classification) may be used, using only one tool is then a special case. Thus, FIG. 12 shows a parameter structuring for congestion level dependent QoS targets using both bearer marking (QCI in this case) and packet marking.

Here different QoS targets are used on per QCI, per packet marking and per congestion level basis. For each QCI, packet markings are associated with different QoS treatment, and a default QoS treatment may be assigned for the traffic that has no packet marking present. For each congestion level, there is a set of QoS parameters that the operators can set. It is required in this solution that each vendor implements these QoS targets according to this framework, while the exact definition of the QoS targets may be vendor specific. As an example, target bitrates or similar can be used as a QoS target.

Thus, some aspects of the present solution suggest the following concept:

Traffic within a bearer is preferably classified into Traffic Classes (TC).

Each traffic class (TC) is preferably associated with QoS targets—e.g. target throughputs, e.g. such as target bitrates—at pre-defined congestion levels. For example, if two levels of congestion are defined (e.g. High and Low) then two target throughput levels are associated with each congestion level.

The RAN resource allocation is preferably such that it tries to satisfy the throughput targets at the lowest congestion level that is feasible. For example, if the throughput targets for a Low congestion level can be satisfied for all traffic classes, resource allocation is done accordingly. If the throughput targets for the Low congestion level can not be satisfied for all traffic classes, then the throughput targets for a High congestion level will be satisfied if that is feasible. Excess resources that remain over the target throughput levels may be distributed in an unspecified way (e.g., in proportion to the throughput targets, or evenly, or in another way.)

When packet marking is used to differentiate traffic classes within a given QCI, it is preferred that the congestion level corresponding to the traffic classes in the bearers with the given QCI is similar—there can be differences based on the momentary traffic mix, and differences due to difference in radio channel conditions, but the congestion level is expected to increase or decrease similarly for these classes. It might be possible that a traffic classes in a different QCI experience a different level of congestion because e.g., different delay requirements for different QCIs may lead to lower congestion levels in certain QCIs.

When QCI is used to differentiate traffic classes (TCs) which are assigned congestion level specific QoS targets, then it is preferred that the congestion level is similar over a set of QCI values. It shall be possible to control which set of QCIs experience a similar congestion level.

Note that traffic flow in bearers with a certain QCIs may be excluded from the congestion level specific QoS target concept, e.g. QCIs which are used to deliver mission critical traffic with very low delay may get priority over other traffic and hence may experience no congestion.

The RAN congestion level concept presented above gives a framework to define the congestion behavior for a given combination of bearer based traffic classes and packet marking based traffic classification. Given the framework in which operators can set the QoS targets for a traffic class (TC), the packet marking itself does not need to carry any additional information regarding RAN packet treatment. Classifying a traffic flow into a suitable traffic class (TC) and/or packet marking may e.g. be performed by a suitable core network (CN) node, e.g. a GGSN or a PGW node, or in a standalone node in the core network.

There is full flexibility in how the traffic flows are classified in the core network. A number of criteria can be used as basis, e.g. such as:

Service category (such as web, file download, video, etc.)
Application (such as YouTube, Skype, etc.)
Subscription (such as Gold, Silver, Bronze)
Header fields (such as a range of IP addresses or port numbers)
Usage policies (such as heavy user, light user)
Any combination of the above.

In this way, there is flexibility in the core network to map traffic flows into traffic classes (TCs) based on packet marking and/or based on bearer association for the traffic flow, and flexibility in the RAN to assign a set of QoS parameters to each traffic class (TC).

Communicating Congestion Level Dependent QoS Targets to RAN

As noted above, congestion level dependent throughput targets are typically set for each traffic class (TC) such that each traffic class is associated with a QoS target (e.g. a throughput target, e.g. a target bitrates or similar) for each congestion level. It should be noted that congestion level dependent throughput targets are an exemplary realization of general congestion level dependent QoS targets. Besides congestion level dependent throughput targets, embodiments of the present solution are similarly applicable for other possible types of congestion level dependent QoS targets, such as congestion level dependent QoS targets expressed in terms of target delays or target packet loss or similar, or a combination thereof. These congestion level dependent QoS targets can be expressed by a set of QoS parameters. Realizations of embodiments of the present solution are possible wherein these QoS parameters are not standardized, however the parameter structuring with congestion level dependent QoS targets per congestion level for a given traffic class are preferred.

For each TC, the congestion level dependent throughput targets for all congestion levels are preferably sent to the RAN nodes (e.g. such as RNC and/or eNB), so that the RAN node is prepared to provide the intended resource sharing at a specific congestion level. Alternatively, the congestion level dependent throughput targets may be pre-defined in the RAN node(s). The RAN node then tries to apply the lowest congestion level that is feasible, and applies the throughput targets according to that congestion level. If a given congestion level is not feasible, the RAN node may apply the next higher congestion level. If none of the congestion levels are feasible then the RAN node actions may be implementation dependent. Also, the resources remaining after the targets have been met may be shared in an implementation specific way.

Note also that the congestion dependent QoS targets (e.g. such as congestion level dependent throughput targets) are preferably set in advance, i.e. without knowing the momentary congestion level in the RAN node. Once these throughput targets are set in advance and communicated to or pre-defined in the RAN node, the RAN node can apply the target that fits the momentary congestion level.

There are two preferred options for informing the RAN node about the congestion level dependent QoS targets: explicit control signaling of the throughput targets, or in-band user plane signaling.

Explicit Control Signaling of Congestion Level Dependent QoS Targets.

With this alternative, the congestion level dependent QoS target such as throughput targets are communicated from the CN to the RAN node, e.g. during bearer establishment or bearer modification. This can be achieved by including the list of throughput targets or similar for all traffic classes which applies to the given bearer, and for all congestion levels. The RAN node may then maintain these values in its user specific context, it may also pass this values on to a new RAN node in case of congestion. Note that in addition to the throughput targets, it is also possible to optionally include delay targets for the given traffic class, to indicate whether or not (and to what extent) the given traffic is delay sensitive.

Implicit Control Signaling of Congestion Level Dependent QoS Targets.

With this alternative, a given traffic class is associated with an index, here called Throughput Target Set Index or TTSI for short. Pre-configuration in the RAN maps the TTSI to a set of throughput targets for the different congestion levels. The pre-configuration can be achieved e.g. by O&M, or by explicit control signaling that is performed e.g., when a RAN node is switched on or at other times. Once the throughput targets for a TTSI are pre-configured, it is sufficient to supply the TTSI for a given traffic class to make the throughput targets known in the RAN for that traffic class.

Supplying the TTSI is possible by packet marking, i.e. adding a new packet header such as e.g. a GTP-U header. Note that the TTSI may be identical to the identifier of the traffic class (TC) itself, e.g., it is possible to use a packet header field both as an identifier of the traffic class and as TTSI, identifying the set of congestion level dependent QoS targets. It is also possible to use separate header fields to identify the TC and to identify the TTSI.

Supplying the TTSI is also possible with explicit control signaling. For example, at bearer setup it is possible to supply a list of TTSIs that are to be used for the TCs within the bearer. Then, the RAN node can e.g., reserve separate TEIDs for the TCs within the bearer, and then use the list of supplied TTSIs to associate a set of throughput targets with each TCs.

Supplying the TTSI is also possible via the use of bearer based differentiation, e.g. so that TTSI corresponds to the QCI for the bearer in question. Combinations are also possible, i.e. the combination of QCI and packet marking determines the TTSI.

In-Band User Plane Signaling of Congestion Level Dependent QoS Targets.

With this alternative, a new packet congestion level marking is used to communicate the throughput targets to the RAN node. For this packet marking, it is possible to use a GTP-U extension hearer, or the Differentiated Service Code Point filed (DSCP field) in the IP header or other header fields. Consider that the throughput targets for a given traffic class are $T_H$, $T_M$, $T_L$ for high, medium and low congestion levels, respectively. Then, a packet marking is applied such that 0-$T_H$ of the total throughput is marked with marking e.g. 0; $T_M$-$T_H$ of the total throughput is marked with marking e.g., 1; $T_L$-$T_M$ of the total throughput is marked with marking e.g., 2; traffic in excess of $T_L$ is marked with marking e.g., 3. This can e.g. be achieved by applying a marker using 3 token buckets to the traffic flow within the traffic class, where the rate of the token buckets is $T_H$, $T_M$-$T_H$ and $T_L$-$T_M$. Other methods based on bitrate measurement are also possible.

Once the traffic congestion level is marked as outlined above, the RAN node can determine the throughput targets by measuring the total throughput of the packets with different markings. In the example above, the RAN node can measure the throughput of packets with marking 0 to get the throughput threshold $T_H$; the RAN node can measure the throughput of packets with marking 0 and 1 to get the throughput threshold $T_M$; the RAN node can measure the throughput of packets with marking 0, 1 and 2 to get the throughput threshold $T_L$. Using the measured throughput targets, the RAN node can then provide the expected resource sharing. The RAN node can store the measurement in the user context. During handover, it is possible to pass on the most recent measurement to the new RAN node, but it is also possible for the new RAN node to start over the measurement again.

The in-band user plane signaling of throughput targets has the advantage that it does not require control signaling for the throughput targets, and it can work even if the throughput targets are not passed on during handovers. Also, it is easier to dynamically change the throughput targets, e.g. depending on the actual settings of a video codec, or with the changes of the traffic pattern. Additionally, the in-based user plane signaling also allows the packet markings to be used in the transport network. On the other hand, the explicit or implicit control plane signaling of the throughput targets does not require RAN measurements and the additional marking.

Note that the methods can also be used in combination, i.e. use explicit or implicit control signaling to inform the RAN about the throughput targets, yet at the same time use packet congestion level marking to mark the packets with different values depending on how many throughput thresholds the given packet exceeds. The advantage of using both methods is that the packet marking can be utilized in the transport network, while the RAN can use the more simple explicit or implicit control signaling to be informed about the throughput targets.

Roaming Case

In case of a roaming subscriber, the congestion level dependent QoS targets may be set by the home network and may be overridden in the visited network. This enables the visited network to apply its own policies on roaming subscribers. In case of explicit signaling of congestion level dependent QoS targets, this can e.g. be performed by replacing the throughput targets in the control signaling. In case of implicit signaling of throughput targets, this can e.g. be performed by replacing the TTSI in the control signaling In case of in-band user plane signaling of throughput targets, this require re-marking the packets according to the visited network's policies.

Transport Network Support

As outline above, a packet congestion level marking is possible to apply depending on how many of the congestion level dependent QoS targets are exceeded with a given packet. Such a packet marking could e.g. be applied in the DSCP field, or mapped to lower layers, e.g., mapped to Ethernet drop eligibility. It is possible to map multiple marking levels to a single lower layer marking in case the lower layers support fewer levels of differentiation. As noted above, the packet marking depending on how many congestion level dependent QoS targets such as throughput thresholds are exceeded are possible to apply no matter whether the RAN node is based on explicit or implicit notification of the throughput targets, or also uses the packet markings to measure the throughput targets.

In this way, the transport network can utilize the congestion level dependent QoS targets, and in cases of congestion apply a resource control mechanism based on the marking. A typical such resource control mechanism is to apply differentiated packet dropping. For example, packets with higher marking levels can have a higher precedence for packet dropping in case a packet drop is necessary, as determined e.g. by the buffer length status in transport equipment. Such multiple differentiated levels are already supported by routers which support differentiated services assured forwarding (RFC2597) where multiple drop levels are used within a class. An advantage of using the packet markings in the transport (e.g. in the transport layer and/or in the transportation network) is that the same resource sharing target can be applied in the transport as well as in the RAN air interface. Note that the application of drop precedence based on the packet marking is possible to use for aggregate traffic as well, i.e., the transport equipment does not need to separate traffic for each user.

Possible RAN Implementation

There can be many implementations defining how the resource sharing at the air interface is performed based on the throughput targets. One example implementation is outlined below.

The example implementation is similar to how the transport network can work, as described above. For this, the RAN node utilizes congestion level marking similarly as for the in-band based user plane signaling of throughput values. For example, consider that the throughput targets for a given traffic class are $T_H$, $T_M$, $T_L$ for high, medium and low congestion levels, respectively. Then, a packet marking is applied such that 0-$T_H$ of the total throughput is marked with marking e.g. 0; $T_M$-$T_H$ of the total throughput is marked with marking e.g., 1; $T_L$-$T_M$ of the total throughput is marked with marking e.g., 2; traffic in excess of $T_L$ is marked with marking e.g., 3. (For the case when the implementation takes place in a single RAN node, the congestion level marking is only logical concept.)

This type of marking may already be available in the RAN node if we use in-based user plane signaling of throughput values or similar. In case of explicit or implicit control signaling of throughput targets, the RAN node can measure the traffic against the throughput targets and mark the packets internally depending on how many throughput targets are exceeded.

Once the congestion level marking is available in the RAN node, it can apply differentiated packet dropping depending on the congestion level marking. I.e., the packets with a higher congestion level marking have a higher drop precedence value. The packets with a higher drop precedence are dropped earlier in case the buffer length increases during congestion.

Note that the RAN can apply the throughput targets for traffic classes not only within a given user, but also between users as well. In that way, an overall resource sharing control can be achieved that allocates resources both between and within users in accordance with the throughput targets set by the operator.

Note that the above example implementation does not require any 3GPP access specific RAN functions, and hence it can also be implemented over non-3GPP accesses such as WLAN, WiFi or cdma2000. The example implementation can be utilized in the same way, i.e. apply different congestion level packet markings based on the throughput thresholds, and use different drop precedence depending on the congestion level marking. This method could e.g. be applied for WiFi access connected to a PGW over an S2a interface.

Figure 13:
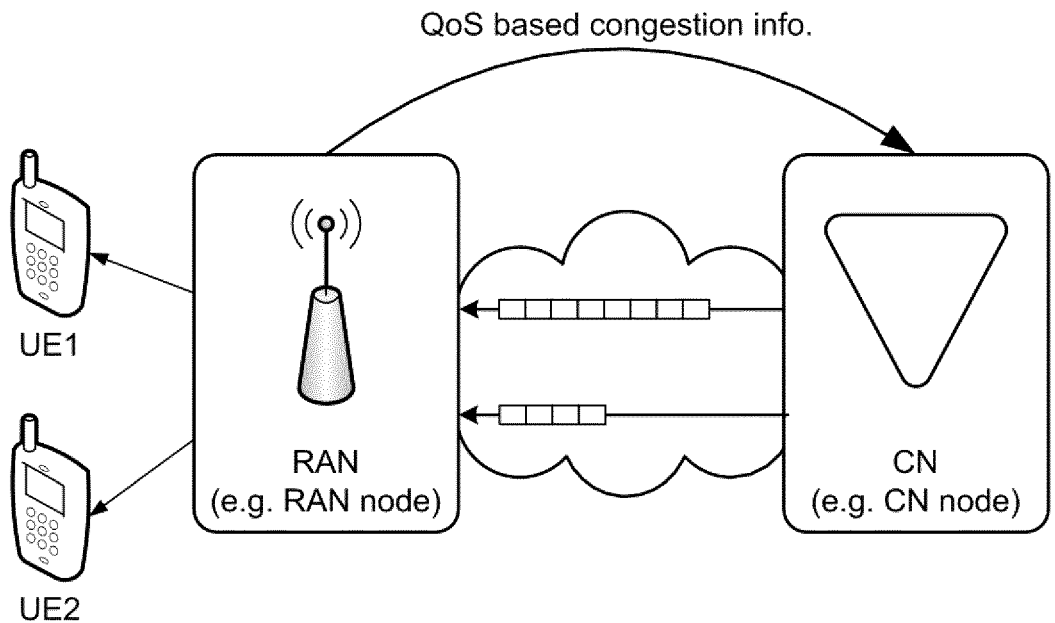
FIG. 13 shows a schematic illustration of an exemplifying congestion feedback based on congestion level dependent QoS targets reported based on whether QoS targets for traffic flows are fulfilled.

Communicating a RAN Congestion from RAN to CN Based on Congestion Level Dependent QoS Targets Congestion feedback based on congestion level dependent QoS targets is based on to what extent congestion level dependent QoS targets for traffic flows can be fulfilled. A main characteristic of congestion level dependent QoS congestion feedback is that it can differentiate in the congestion status while RAN is fully loaded. Congestion feedback based on congestion level dependent QoS targets is illustrated in FIG. 13, schematically illustrating congestion feedback based on QoS targets (e.g. congestion level dependent QoS targets) reported based on whether QoS targets for traffic flows are fulfilled.

To enable congestion feedback based on congestion level dependent QoS targets, traffic flows are preferably differentiated into traffic classes (TCs) as described above, e.g. using bearers/QCI based differentiation and/or packet marking. For each traffic class (TC), a RAN node is configured with congestion level dependent QoS targets. The RAN node can then determine whether or not the congestion level dependent QoS targets can be fulfilled for a particular traffic flow at a particular congestion level in the RAN node. The RAN node can also determine whether a low QoS is due to congestion in the RAN, or simply because the given traffic flow does not have more traffic. Congestion is reported if one ore more congestion level dependent QoS targets cannot be met due to congestion in the RAN node. Conversely, no congestion is reported if the congestion level dependent QoS targets can be met, even if there is congestion in the RAN node. Preferably, no congestion is reported if one or more congestion level dependent QoS targets cannot be met while there is no congestion in the RAN node. This type of differentiation is possible since the RAN node is the bottleneck point performing the resource allocation, so it can determine whether or not more resources could have been given to a given traffic flow.

Based on whether or not one or more congestion level dependent QoS targets can be fulfilled, it is possible to report not only a binary value of congestion/no congestion, but also the character of the congestion, e.g. the specific level of congestion. For example, the following scheme can be applied for the congestion feedback signalling:

"no congestion"=traffic flows can receive better QoS than the target for "low congestion level";

"low congestion"=traffic flows can receive better QoS than the target for "high congestion level" but receive QoS that is worse than or equal to the target for "low congestion level";

"high congestion"=flows receive QoS that is worse than or equal to the target for "high congestion level".

Congestion feedback based on congestion level dependent QoS targets can consider the actual QoS requirements of the different traffic flows in making the congestion feedback. In this way, it can also incorporate the relative importance of the different traffic flows from the operator's perspective.

Figure 14:
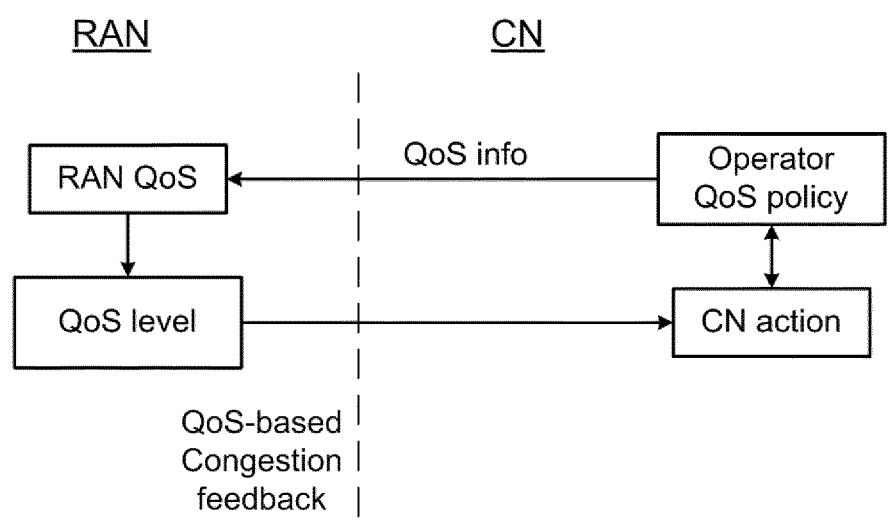
FIG. 14 shows a schematic illustration of an exemplifying RAN-CN functional split for congestion feedback based on QoS targets (e.g. congestion level dependent QoS targets).

FIG. 14 shows the functional split between Radio Access Network (RAN) and Core Network (CN) with congestion feedback from the RAN to the CN based on congestion level dependent QoS targets. Since the QoS level may now be directly or indirectly reported by RAN node using congestion feedback based on congestion level dependent QoS targets, there is no need for a re-modelling of the RAN QoS in the CN, and the QoS level is immediately available for CN action, as configured by the operator policy. In this way, the congestion feedback from the RAN to the CN based on congestion level dependent QoS targets not only simplifies the CN by avoiding an unnecessary re-modelling of the RAN status, but also makes the QoS level reporting much more accurate, since the CN re-modelling or RAN status can never be as accurate as the RAN's explicit determination of the QoS level that it experiences.

In a radio cell the channel quality of different UEs can significantly differ from each other. It is often hard to provide the desired QoS to UEs with poor radio channel quality. This effect can also be taken into account during reporting, e.g. when the target QoS of a congestion level cannot be provided only for a small subset of UEs (e.g. 5-10%) then the RAN vendor might decide to not report that level of congestion.

In a network where both load-based congestion feedback and congestion feedback from the RAN to the CN based on congestion level dependent QoS targets are used, it is useful to differentiate the two types of congestion feedback, as a RAN and CN implementation uses different functional split as discussed above. RAN and CN implementations hence do not interwork well if they have different assumptions about whether the congestion feedback is load-based or QoS-based as indicated above.

Hence, it is possible to signal an indication together with the congestion feedback whether it is load-based or QoS-based as indicated above. Such an indication helps the CN to take the proper set of actions.

It is also possible to apply an a priori negotiation between the CN and the RAN about whether the RAN and the CN supports load-based or QoS-based congestion feedback as indicated above. Based on such negotiation, it is possible to use the type of congestion feedback that is supported for both sides. For example, if RAN or CN does not support QoS-based congestion feedback as described above, then load-based congestion feedback is used; if both RAN and CN support QoS-based congestion feedback, then QoS-based congestion feedback is used.

It is possible to set a minimal congestion level in the RAN below which changes in the congestion level are not reported to the CN. This can be a way to reduce the network signaling load generated by congestion feedback signaling, and send signaling only for the cases when really needed. This configuration could be achieved by sending a minimal congestion level, e.g. for either a given UE, or on a per bearer basis, from the CN to the RAN. As a special case, it is also possible to disable congestion feedback reporting for certain UEs or for certain bearers to reduce signaling. The configuration of RAN can e.g. be done when the RAN context is initially set up as the UE moves into connected mode, by adding a new information element. For LTE, this information can be conveyed e.g., in the Initial Context Setup Request sent from the MME to the eNB. Note that it is also possible to set a minimal congestion level for reporting for a whole cell, or for a given RAN area. This can be achieved via O&M configuration. The per user, per bearer or per cell/area granularity is not exclusive for setting a congestion feedback level reporting threshold. A combination of these approaches are also possible, and in case there are several configurations applying to a given case, it is possible to use either the minimal or the maximal congestion level reporting threshold.

The solutions discussed above may e.g. provide one or more of the following advantages:
- Achieve QoS differentiation for traffic classes within a given user.
- Achieve QoS differentiation between different users.
- Very flexible subscription and service based operator configuration.
- Scales well for a high number of users, services and subscriptions.
- Throughput configuration is in line with QoE aware operator policies
- Flexible congestion handling at multiple levels of congestion with different policies applicable at each congestion level.
- Transport level QoS also possible
- Same resource sharing target both in the air interface and in the transport network
- All traffic classes are possible to assign resources to; starvation effect is avoided (as would be the case with priority based mechanisms that may assign no resources to lower priority traffic classes).
- The method is also applicable to the case of non3GPP access such as WiFi access, which can be e.g., connected to the PGW over an S2a interface.

Furthermore, feedback from the RAN to the CN based on congestion level dependent QoS targets gives a clear meaning to the congestion feedback signaling as follows:
- It gives a way to determine whether or not the end-user experience has been compared to the QoS target, such that the congestion feedback can be sent only when needed.
- It can differentiate between the cases when a high-level of utilization of RAN resources is a normal mode of operation and when it is not.
- It provides a unified framework for operators to provide the necessary RAN configuration.

Moreover, Feedback from the RAN to the CN based on congestion level dependent QoS targets has a number of advantages over load-based congestion feedback.

- Clear interpretation. The congestion feedback is based on whether or not a well-defined QoS target is met, so there is no ambiguity.
- Simple processing in the CN. Because of the clear interpretation of the congestion feedback, there is no need to re-model the RAN congestion status. In fact, QoS based congestion feedback can enable the use of pre-configured mitigation policy: once the QoS-based congestion feedback is received, the mitigation policy can be applied without further CN processing, in case such a mitigation policy has been deemed appropriate by the operator and it is pre-configured in the CN.
- QoS level information is accurate. Because there is no need for CN approximation of the RAN QoS level, the QoS-based congestion feedback can utilize an accurate metric of the QoS level coming directly from the RAN, and the inaccuracy of CN re-modeling of RAN status is avoided.
- Low signalling. While the changes in the RAN load status can be very frequent, changes in the congestion level specific QoS target fulfilment are expected to be infrequent, and a fully loaded RAN does not necessarily lead to congestion feedback to the operator. By limiting the congestion feedback to the cases when the operator defined QoS targets fail to be fulfilled, the signalling is expected to drop by at least an order of magnitude. Note that the signalling can be further reduced by configuring RAN to only report "high congestion" and not report "low congestion" in cases when the operator wants to take action only for high congestion level.
- Full RAN utilization. With QoS-based congestion feedback the RAN resources can be 100% utilized because it can differentiate based on the QoS target fulfilment even at full load. Therefore, a CN mitigation together with QoS-based congestion feedback can oscillate around a given QoS-based congestion level while the RAN can remain fully utilized.
- Consistent QoS for congestion feedback and short/medium term RAN handling. This approach makes use of the QoS information that is needed in the RAN for short/medium term handling. By basing the congestion feedback on the very same QoS targets, a system-wide consistent handling can be achieved for short/medium term RAN actions as well as any potential CN actions using the congestion feedback.

Some embodiments described herein may be summarized in the following manner:

One embodiment is directed to a method in a core network, CN, node for handling quality of service, QoS, targets for traffic flows between a radio access network, RAN, node and a radio terminal (300) served by the RAN node, wherein the method comprises:
- obtaining a number of traffic classes into which the traffic flows can be classified,
- defining QoS targets for each obtained traffic class for at least two congestion levels,
- providing the traffic classes with the associated QoS targets and congestion levels to the RAN node so as to provide congestion level dependent QoS targets for the traffic classes to the RAN node.

The method may further comprise:
- classifying received traffic flows into traffic classes corresponding to the defined congestion level dependent QoS targets indicating the traffic classes,
- forwarding the classified traffic flows to the RAN node.

The method may comprise: receiving congestion information from the RAN node indicating a failure of satisfying a congestion level dependent QoS target in the RAN node.

The method may comprise:
determining load instructions to be used by the RAN node for reducing or adapting the congestion level dependent QoS congestion in the RAN node,
sending the load instructions to the RAN node.

The obtaining of the method may comprise:
receiving the traffic classes into which the traffic flows can be classified from another CN node, or
pre configuring in the in the receiving CN node traffic classes into which the traffic flows can be classified.

The classifying of the method may comprise: marking each received traffic flow so as to associate the traffic flow with a traffic class.

The traffic classes and the QoS targets and the congestion levels may be set in advance without knowledge of a momentary congestion level in the RAN node so as to provide congestion level dependent QoS targets set in advance.

Some other embodiments described herein may be summarized in the following manner:

One other embodiment is directed to a core network, CN, node for handling quality of service, QoS, targets for traffic flows between a radio access network, RAN, node and a radio terminal served by the RAN node, wherein a processing circuitry is configured to operatively:
obtain a number of traffic classes into which the traffic flows can be classified,
define QoS targets for each obtained traffic class for at least two congestion levels,
provide the traffic classes with the associated QoS targets and congestion levels to the RAN node so as to provide congestion level dependent QoS targets for the traffic classes to the RAN node.

The processing circuitry may be further configured to operatively:
classify traffic flows received by the CN node into traffic classes corresponding to the defined congestion level dependent QoS targets indicating the traffic classes,
forward the classified traffic flows to the RAN node.

The processing circuitry may be further configured to operatively: receive congestion information from the RAN node indicating a failure of satisfying a congestion level dependent QoS target in the RAN node.

The processing circuitry may be further configured to operatively:
determining load instructions to be used by the RAN node for reducing or adapting the congestion level dependent QoS congestion in the RAN node,
sending the load instructions to the RAN node.

The processing circuitry may be further configured to operatively:
receive the traffic classes into which the traffic flows can be classified from another CN node, or
pre configure in the in the receiving CN node traffic classes into which the traffic flows can be classified.

The processing circuitry may be further configured to operatively: mark each received traffic flow so as to associate the traffic flow with a traffic class.

The processing circuitry may be further configured to operatively: set the traffic classes and the QoS targets and the congestion levels in advance, without knowledge of a momentary congestion level in the RAN node, so as to provide congestion level dependent QoS targets set in advance.

Some other embodiments described herein may be summarized in the following manner:

One other embodiment is directed to a method in a radio access network, RAN, node for handling quality of service, QoS, targets for traffic flows between the RAN, node and a wireless terminal served by the RAN node, wherein the method comprises:
defining traffic classes into which the traffic flows can be classified and QoS targets for at least two congestion levels for each traffic class so as to provide congestion level dependent QoS targets for the traffic classes in the RAN node.
classifying each traffic flow received by the RAN node into a traffic class,
obtaining congestion information indicating a congestion level in the RAN node and determining a QoS target for each traffic class based on the obtained congestion level and the congestion level dependent QoS targets.

In the method, the defining may comprise:
receiving from a core network, CN, node said congestion level dependent QoS targets for the traffic classes, or
pre configuring in the RAN node said congestion level dependent QoS targets for the traffic classes.

The method may comprise:
detecting that at least one congestion level dependent QoS target cannot be satisfied at the congestion level indicated by the obtained congestion information, and
sending congestion information to a CN node indicating a congestion level dependent QoS target congestion in the RAN node.

The method may comprise:
receiving from the CN node load instructions to be used by the RAN node for reducing or adapting the congestion level dependent QoS congestion in the RAN node.

The method may comprise:
applying the congestion level dependent QoS targets based on the congestion level indicated by the obtained congestion information.

The method may comprise:
applying the congestion level dependent QoS targets such that if a given congestion level indicated by the congestion level dependent QoS targets is not feasible, then the next higher congestion level indicated by the by the congestion level dependent QoS targets should be applied Some other embodiments described herein may be summarized in the following manner:

One other embodiment is directed to a radio access network, RAN, node for handling quality of service, QoS, targets for traffic flows between the RAN, node and a wireless terminal served by the RAN node, wherein a processing circuitry is configured to operatively:
define traffic classes into which the traffic flows can be classified and QoS targets for at least two congestion levels for each traffic class so as to provide congestion level dependent QoS targets for the traffic classes in the RAN node,
classify each traffic flow received by the RAN node into a traffic class,
obtain congestion information indicating a congestion level in the RAN node and determining a QoS target for each traffic class based on the obtained congestion level and the congestion level dependent QoS targets.

The processing circuitry may be further configured to operatively define said traffic classes into which the traffic flows can be classified and QoS targets for at least two congestion levels for each traffic class by:

receive said congestion level dependent QoS targets for the traffic classes from a core network, CN, node, or pre configure in the RAN node said congestion level dependent QoS targets for the traffic classes.

The processing circuitry may be further configured to operatively:
detect that at least one congestion level dependent QoS target cannot be satisfied at the congestion level indicated by the obtained congestion information, and
send congestion information to a CN node indicating a congestion level dependent QoS target congestion in the RAN node.

The processing circuitry may be further configured to operatively:
receive from the CN node load instructions to be used by the RAN node for reducing or adapting the congestion level dependent QoS congestion in the RAN node.

The processing circuitry may be further configured to operatively:
apply the congestion level dependent QoS targets based on the congestion level indicated by the obtained congestion information.

The processing circuitry may be further configured to operatively:
apply the congestion level dependent QoS targets such that if a given congestion level indicated by the congestion level dependent QoS targets is not feasible, then the next higher congestion level indicated by the by the congestion level dependent QoS targets should be applied.

The example embodiments presented herein are not limited to LTE, but may apply in any RAN, single- or multi-RAT. Some other RAT examples are LTE-Advanced, UMTS, HSPA, GSM, cdma2000, HRPD, WiMAX, and WiFi. The foregoing description of the example embodiments have been presented for purposes of illustration and description.

The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

ABBREVIATIONS

S1-MME: Reference point for the control plane protocol between E-UTRAN and MME.
S1-U Reference point between E-UTRAN and Serving GW for the per bearer user plane tunnelling and inter eNodeB path switching during handover.
S3: It enables user and bearer information exchange for inter 3GPP access network mobility in idle and/or active state.
S4: It provides related control and mobility support between GPRS Core and the 3GPP Anchor function of Serving GW. In addition, if Direct Tunnel is not established, it provides the user plane tunnelling.
S5: It provides user plane tunnelling and tunnel management between Serving GW and PDN GW. It is used for Serving GW relocation due to UE mobility and if the Serving GW needs to connect to a non-collocated PDN GW for the required PDN connectivity.
S6a: It enables transfer of subscription and authentication data for authenticating/authorizing user access to the evolved system (AAA interface) between MME and HSS.
Gx: It provides transfer of (QoS) policy and charging rules from PCRF to Policy and Charging Enforcement Function (PCEF) in the PDN GW.
S8: Inter-PLMN reference point providing user and control plane between the Serving GW in the VPLMN and the PDN GW in the HPLMN. S8 is the inter PLMN variant of S5.
S9: It provides transfer of (QoS) policy and charging control information between the Home PCRF and the Visited PCRF in order to support local breakout function.
S10: Reference point between MMEs for MME relocation and MME to MME information transfer.
S11: Reference point between MME and Serving GW.
S12: Reference point between UTRAN and Serving GW for user plane tunnelling when Direct Tunnel is established. It is based on the Iu-u/Gn-u reference point using the GTP-U protocol as defined between SGSN and UTRAN or respectively between SGSN and GGSN. Usage of S12 is an operator configuration option.
S13: It enables UE identity check procedure between MME and EIR.
SGi: It is the reference point between the PDN GW and the packet data network. Packet data network may be an operator external public or private packet data network or an intra operator packet data network, e.g. for provision of IMS services. This reference point corresponds to Gi for 3GPP accesses.
Rx: The Rx reference point resides between the AF and the PCRF in the TS 23.203 [6].

AF Application Function
AMBR Aggregate Maximum Bitrate
AN Access Network
ARP Allocation and Retention Priority
AMBR Aggregate Maximum Bit Rate
ANDSF Access Network Discovery and Selection Function
BBERF Bearer Binding and Event Reporting Function
BSC Base Station Controller
BSS Base Station System
BSSGP Base Station System GPRS Protocol
BTS Base Station
CBC Cell Broadcast Centre
CBE Cell Broadcast Entity
CCoA Collocated Care-of-address
CN Core Network
CSG Closed Subscriber Group
CSG ID Closed Subscriber Group Identity
DL TFT Down Link Traffic Flow Template
DPI Deep Packet Inspection
DSCP Differentiated Services Code Point
DSMIPv6 Dual-Stack MIPv6
eAN enhanced AN
eNB Evolved Node B
ECGI E-UTRAN Cell Global Identifier
ECM EPS Connection Management
ECN Explicit Congestion Notification
eGTP enhanced Gateway Tunnelling Protocol
EMM EPS Mobility Management
EPC Evolved Packet Core
EPS Evolved Packet System
ePDG Evolved Packet Data Gateway
E-RAB E-UTRAN Radio Access Bearer
E-UTRAN Evolved Universal Terrestrial Radio Access Network
FACoA Foreign Agent Care-of-Address
GBR Guaranteed Bit Rate
GERAN GSM Edge Radio Access Network
GGSN Gateway GPRS Support Node
GPRS General Packet Radio Service
GRE Generic Routing Encapsulation
GSM Global Communications System
GTP GPRS Tunneling Protocoll
GTP-C GTP control
GTP-U GTP user data tunneling
GUMMEI Globally Unique MME Identifier
GUTI Globally Unique Temporary Identity
GW Gateway
H ANDSF Home-ANDSF
HeNB Home eNode B
HeNB GW Home eNode B Gateway
HFN Hyper Frame Number
HO HandOver
HRPD High Rate Packet Data
HSGW HRPD Serving GateWay
IE Information Element
IETF Internet Engineering Task Force
IMSI International Mobile Station Identity
IFOM IP Flow Mobility
IP Internet Protocol
IPMS IP Mobility management Selection
ISR Idle mode Signalling Reduction
LBI Linked EPS Bearer Id
L-GW Local GateWay
LIPA Local IP Access
LMA Local Mobility Anchor
LTE Long Term Evolution
MAG Mobile Access Gateway
MAPCON Multi Access PDN Connectivity
MBR Maximum Bit Rate
MIB Minimum Bit Rate
MIPv4 Mobile IP version 4
MIPv6 Mobile IP version 6
MME Mobility Management Entity
MMEC MME Code
MSC Mobile Switching Center
MTC Machine-Type Communications
M-TMSI M-Temporary Mobile Subscriber Identity
NB NodeB
NIDB Network Initiated Dedicated Bearer
OFCS Offline Charging System
OMC-ID Operation and Maintenance Centre Identity
O&M Operation and Management
PCC Policy Control and Charging
PCF Packet Control Function
PCEF Policy and Charging Enforcement Function
PCRF Policy and Charging Rules Function
PDN Packet data Network
PDN GW Packet Data Network Gateway
PDP Packet Data Protocol
PGW PDN Gateway
PDCP Packet Data Convergence Protocol
PLMN Public Land Mobile Network
PMIP Proxy Mobile IP
PMIPv6 Proxy Mobile IP version 6
PSAP Public Safety Answering Point
PTI Procedure Transaction Id
QCI QoS Class Identifier
QoS Quality of Service
OCS Online Charging Systems
QoE Quality of Experience
QoS Quality of Service
QSUP QoS based on Service information in User Plane protocol
OTT Over the Top
RAN Radio Access Network
RFSP RAT/Frequency Selection Priority
RNAP Radio Access Network Application Part
RNC Radio Network Controller
SACC Service Aware Charging and Control
SGSN Serving GPRS Support Node
SGW Serving Gateway
SectorID Sector Address Identifier
S-TMSI S-Temporary Mobile Subscriber Identity
SDF Service Data Flow
SI Service Identification
SIPTO Selected IP Traffic Offload
SPI Shallow packet inspection
TAC Tracking Area Code
TAD Traffic Aggregate Description
TAI Tracking Area Identity
TAU Tracking Area Update
TC Traffic Class
TDF Traffic Detection Function
TEID Tunnel End Point Identifier
TI Transaction Identifier
TIN Temporary Identity used in Next update
TDF Traffic Detection Function
UE User Equipment
UDP User Datagram Protocol
UMTS Universal Mobile Telecommunications System
URRP-MME UE Reachability Request Parameter for MME
UTRAN UMTS Terrestria Radio Access Network
UL TFT UpLink Traffic Flow Template
ULR-Flags Update Location Request Flags UPCON User Plane Congestion Management
VLR Visitor Location Register
V ANDSF Visited-ANDSF
VS Vendor Specific

The invention claimed is:

1. A method in a first core network (CN) node for handling quality of service (QoS) targets for traffic flows between a radio access network (RAN) node and a radio terminal served by the RAN node, the method comprising:
    defining a plurality of traffic classes into which the traffic flows can be classified, said plurality of traffic classes comprising a first traffic class and a second traffic class;
    defining QoS targets for each of the plurality of traffic classes for at least two congestion levels, wherein defining QoS targets for each of the plurality of traffic classes for at least two congestion levels comprises:
        defining a first plurality of QoS targets for the first traffic class, wherein defining the first plurality of QoS targets for the first traffic class comprises: defining a first QoS target for the first traffic class and a first congestion level and defining a second QoS target for the first traffic class and a second congestion level; and
        defining a second plurality of QoS targets for the second traffic class, wherein defining the second plurality of QoS targets for the second traffic class comprises:
    defining a third QoS target for the second traffic class and the first congestion level and defining a fourth QoS target for the second traffic class and the second congestion level; and
    providing the traffic classes with the associated QoS targets and congestion levels to the RAN node so as to provide congestion level dependent QoS targets for the traffic classes to the RAN node, wherein the step of providing comprises transmitting to the RAN node i) information identifying the first plurality of QoS targets for the first traffic class and ii) information identifying the second plurality of QoS targets for the second traffic class.

2. The method of claim 1, wherein the method further comprises:
    classifying received traffic flows into traffic classes corresponding to the defined congestion level dependent QoS targets indicating the traffic classes, and
    forwarding the classified traffic flows to the RAN node.

3. The method of claim 1, wherein the method further comprises:
    receiving congestion information from the RAN node indicating a failure of satisfying a congestion level dependent QoS target in the RAN node.

4. The method of claim 3, wherein the method further comprises:
    determining load instructions to be used by the RAN node for reducing or adapting the congestion level dependent QoS congestion in the RAN node, and
    sending the load instructions to the RAN node.

5. The method of claim 1, wherein the step of defining comprises one or more of:
    receiving the traffic classes into which the traffic flows can be classified from a second CN node, and
    pre-configuring in the in the first CN node traffic classes into which the traffic flows can be classified.

6. The method of claim 2, wherein the step of classifying comprises:
    marking each received traffic flow so as to associate the traffic flow with a traffic class.

7. The method of claim 1, wherein:
    the traffic classes and the QoS targets and the congestion levels are set in advance without knowledge of a momentary congestion level in the RAN node so as to provide congestion level dependent QoS targets set in advance.

8. A first core network (CN) node for handling quality of service (QoS) targets for traffic flows between a radio access network (RAN) node and a radio terminal served by the RAN node, the first CN node comprising:
    a transmitter; and
    processing circuitry coupled to the transmitter, wherein the processing circuitry is configured to:
        define a plurality of traffic classes into which the traffic flows can be classified, said plurality of traffic classes comprising a first traffic class and a second traffic class;
        define QoS targets for each of the plurality of traffic classes for at least two congestion levels, wherein the processing circuitry is configured to define QoS targets for each of the plurality of traffic classes for at least two congestion levels by performing a process comprising:
            defining a first plurality of QoS targets for the first traffic class, wherein defining the first plurality of QoS targets for the first traffic class comprises: defining a first QoS target for the first traffic class and a first congestion level and defining a second QoS target for the first traffic class and a second congestion level; and
            defining a second plurality of QoS targets for the second traffic class, wherein defining the second plurality of QoS targets for the second traffic class comprises: defining a third QoS target for the second traffic class and the first congestion level and defining a fourth QoS target for the second traffic class and the second congestion level; and
        employ the transmitter to transmit to the RAN node i) information identifying the first plurality of QoS targets for the first traffic class and ii) information identifying the second plurality of QoS targets for the second traffic class.

9. The first CN node of claim 8, wherein the processing circuitry is further configured to:
    classify traffic flows received by the first CN node into traffic classes corresponding to the defined congestion level dependent QoS targets indicating the traffic classes, and
    forward the classified traffic flows to the RAN node.

10. The first CN node of claim 8, wherein the processing circuitry is further configured to:
    receive congestion information from the RAN node indicating a failure of satisfying a congestion level dependent QoS target in the RAN node.

11. The first CN node of claim 10, wherein the processing circuitry is further configured to:
    determining load instructions to be used by the RAN node for reducing or adapting the congestion level dependent QoS congestion in the RAN node,
    sending the load instructions to the RAN node.

12. The first CN node of claim 8, wherein the processing circuitry is further configured to:
    receive the traffic classes into which the traffic flows can be classified from a second CN node, or
    pre-configure in the first CN node traffic classes into which the traffic flows can be classified.

13. The first CN node of claim 9, wherein the processing circuitry is further configured to:

mark each received traffic flow so as to associate the traffic flow with a traffic class.

14. The first CN node of claim 8 wherein the processing circuitry is further configured to:
set the traffic classes and the QoS targets and the congestion levels in advance, without knowledge of a momentary congestion level in the RAN node, so as to provide congestion level dependent QoS targets set in advance.

15. A method in a radio access network (RAN) node for handling quality of service (QoS) targets for traffic flows between the RAN, node and a wireless terminal served by the RAN node, wherein the method comprises:
obtaining QoS information, wherein, for each one of a plurality of tuples consisting of a traffic class and a congestion level, the QoS information comprises QoS target information mapping a QoS target to said traffic class/congestion level tuple such that the QoS information comprises: i) first QoS target information mapping a first QoS target to a first tuple consisting of a first traffic class and a first congestion level, ii) second QoS target information mapping a second QoS target to a second tuple consisting of the first traffic class and a second congestion level, iii) third QoS target information mapping a third QoS target to a third tuple consisting of a second traffic class and the first congestion level, and iv) fourth QoS target information mapping a fourth QoS target to a fourth tuple consisting of the second traffic class and the second congestion level;
receiving a traffic flow;
classifying the received traffic flow into one of the plurality of traffic classes;
obtaining congestion information indicating a congestion level in the RAN node; and
using the obtained QoS information, determining a QoS target that is mapped to the tuple consisting of i) the traffic class into which the received traffic flow is classified and ii) the indicated congestion level.

16. The method of claim 15, wherein obtaining the QoS information comprises one of:
receiving the QoS information from a core network, (CN), node said congestion level dependent QoS targets for the traffic classes; and
pre-configuring in the RAN node said QoS information.

17. The method of claim 15, wherein the method further comprises:
detecting that the selected QoS target for the received traffic flow cannot be satisfied at the congestion level indicated by the obtained congestion information, and
sending congestion information to a core network (CN) node indicating a congestion level dependent QoS target congestion in the RAN node.

18. The method of claim 17, wherein the method further comprises:
receiving from the CN node load instructions to be used by the RAN node for reducing or adapting the congestion level dependent QoS congestion in the RAN node.

19. The method of claim 15, wherein the method further comprises:
applying the determined QoS target for the received traffic flow.

20. The method of claim 19, wherein
the determined QoS target is a bitrate target;
the method further comprises: applying for the received traffic flow a bitrate target that is different than the determined bitrate target when it is not feasible to achieve the determined bitrate target.

21. A radio access network (RAN) node for handling quality of service (QoS) targets for traffic flows between the RAN, node and a wireless terminal served by the RAN node, the RAN node comprising:
a transmitter;
a receiver; and
processing circuitry coupled to the transmitter and the receiver, wherein the processing circuitry is configured to:
obtain QoS information, wherein, for each one of a plurality of tuples consisting of a traffic class and a congestion level, the QoS information comprises QoS target information mapping a congestion level dependent QoS target to said traffic class/congestion level tuple such that the QoS information comprises: i) first QoS target information mapping a first QoS target to a first tuple consisting of a first traffic class and a first congestion level, ii) second QoS target information mapping a second QoS target to a second tuple consisting of the first traffic class and a second congestion level, iii) third QoS target information mapping a third QoS target to a third tuple consisting of a second traffic class and the first congestion level, and iv) fourth QoS target information mapping a fourth QoS target to a fourth tuple consisting of the second traffic class and the second congestion level;
classify a received traffic flow into one of the plurality of traffic classes;
obtain congestion information indicating a congestion level in the RAN node; and
use the obtained QoS information to determine a QoS target that is mapped to the tuple consisting of i) the traffic class into which the received traffic flow is classified and ii) the indicated congestion level.

22. The RAN node of claim 21, wherein the processing circuitry is configured to obtain the QoS information by:
receive said congestion level dependent QoS targets for the traffic classes from a core network, (CN), node, or
pre-configure in the RAN node said congestion level dependent QoS targets for the traffic classes.

23. The RAN node of claim 21, wherein the processing circuitry is further configured to:
detect that at least one congestion level dependent QoS target cannot be satisfied at the congestion level indicated by the obtained congestion information, and
send congestion information to a CN node indicating a congestion level dependent QoS target congestion in the RAN node.

24. The RAN node of claim 23, wherein the processing circuitry is further configured to:
receive from the CN node load instructions to be used by the RAN node for reducing or adapting the congestion level dependent QoS congestion in the RAN node.

25. The RAN node of claim 21, wherein the processing circuitry is further configured to:
apply the congestion level dependent QoS targets based on the congestion level indicated by the obtained congestion information.

26. The RAN node of claim 25, wherein the processing circuitry is configured to:
apply the congestion level dependent QoS targets such that if a given congestion level indicated by the congestion level dependent QoS targets is not feasible, then the next higher congestion level indicated by the congestion level dependent QoS targets should be applied.

* * * * *